US005223826A

United States Patent [19]

Amou et al.

[11] Patent Number: 5,223,826

[45] Date of Patent: Jun. 29, 1993

[54] CONTROL/SUPERVISORY SIGNAL TRANSMISSION SYSTEM

[75] Inventors: Teruhiko Amou, Kawasaki; Yoshitane Saito, Nagaokakyo, both of Japan

[73] Assignee: Nakamura Kiki Engineering Co., Ltd., Kyoto, Japan

[21] Appl. No.: 532,433

[22] Filed: Jun. 1, 1990

Related U.S. Application Data

[63] Continuation-in-part of Ser. No. 237,387, Aug. 26, 1988, Pat. No. 4,937,568.

[30] Foreign Application Priority Data

Jun. 2, 1989 [JP] Japan ................................ 1-140826

[51] Int. Cl.[5] ................................ G05B 23/00

[52] U.S. Cl. ................................ 340/825.06; 340/825.57; 340/310 R

[58] Field of Search ................................ 340/825.06, 825.07, 340/825.36, 825.37, 825.57, 825.65, 288, 310 R

[56] References Cited

U.S. PATENT DOCUMENTS

| | | | |
|---|---|---|---|
| 4,703,451 | 10/1987 | Calabrese | 340/825.07 |
| 4,808,994 | 2/1989 | Riley | 340/825.06 |
| 4,811,561 | 3/1989 | Edwards et al. | 340/825.06 |
| 4,937,568 | 6/1990 | Nakanishi et al. | 340/825.06 |

*Primary Examiner*—Donald J. Yusko
*Assistant Examiner*—Peter S. Weissman
*Attorney, Agent, or Firm*—McGlew and Tuttle

[57] ABSTRACT

A bidirectional control/supervisory system for transmitting control signals from a controller to devices and transmitting supervisory signals from sensors monitoring the devices to the controller through a common transmission line. A transmission/reception control circuit generates a timing signal and a supply voltage of constant level, and converts the voltage into clock pulses having voltage levels differing from the supply voltage. The clock pulses are outputted to the common transmission line under the timing of the timing signals. A first unit group is connected to the controller and the transmission/reception control circuit through the transmission line and includes first transmitter units connected thereto for modulating the level of the clock pulses with control data supplied from the controller and first receiver units connected to the controller and to the transmission/reception control circuit through the transmission line for extracting supervisory signals of the sensors to supply them to the controller. A second group is connected to the transmission/reception control circuit and includes second receiver units connected to the sensors and the common transmission line for demodulating the level of the clock pulses to extract the control data to be supplied to the devices and second transmitter units connected to the sensors and the common line for modulating the levels of the clock pulses with supervisory data signals supplied from the sensors for transmission thereof to the first receiver units.

16 Claims, 13 Drawing Sheets

CONTROL/SUPERVISORY SIGNAL TRANSMISSION SYSTEM

The present application is a continuation-in-part application of application Ser. No. 237,387, filed Aug. 26, 1988 now U.S. Pat. No. 4,937,568.

CROSS REFERENCE TO RELATED APPLICATIONS

Reference is hereby made to the following copending applications dealing with related subject matter and assigned to the assignees of the present invention:

1. "Remote Control System of Serial/Parallel Conversion Type" by K. Nakanishi et al, assigned U.S. Ser. No. 237,387 and filed Aug. 26, 1988 (U.S. Pat. No. 4,937,568).
2. "Serial Transmission System of Parallel Sensor Signal" by K. Nakanishi et al, assigned U.S. Ser. No. 241,019 and filed Sep. 2, 1988, abandoned in favor of application Ser. No. 588,580 filed Sep. 25, 1990.

BACKGROUND OF THE INVENTION

1. Field of the Invention

The present invention generally relates to a system for transmitting control signals and supervisory signals. More specifically, the invention is concerned with a bidirectional control/supervisory signal transmission system which includes a central station and at least a local station which is located remotely from the former and connected thereto by way of a common data signal transmission line and which includes at least an instrument, device or machine to be controlled and monitored (hereinafter also referred to collectively as the controlled devices), wherein control signals generated in parallel in the central station undergo a parallel-to-serial conversion to be transmitted serially to the local station for controlling in parallel the controlled devices after having undergone a serial-to-parallel conversion, while in the local station, supervisory signals indicating the various operating states of the controlled devices are generated and subjected to a parallel-to-serial conversion to be serially transmitted to the central station by way of the common data signal transmission line. In the central control station, the serial supervisory signals are converted into parallel signals for evaluation.

2. Description of the Prior Art

In the field of the automatic control techniques, there is employed widely such a signal transmission system in which control signals are transmitted from a control station including a sequence controller, programmable controller, a computer or the like are transmitted to a number of controlled devices such as electric motors, solenoids, electromagnetic valves, relays, thyristors, lamps and/or the like installed at locations remotely from the control station for controlling the operation thereof, and in which the supervisory signals indicating the states of the controlled devices detected by sensor means such as reed switches, micro-switches, push-button switches or the like bi-state (on/off-state) sensor elements are transmitted to the control station for the evaluation of the operating states of the devices.

The prior art control/supervisory signal transmission system of the type mentioned above requires a number of transmission lines such as power transmission lines, control/supervisory signal transmission lines, clock signal lines, ground potential (reference) lines and others to be connected between the control station and the controlled devices as well as between the control stations and the individual sensors, which involves necessarily a very large amount of hardware for wiring the transmission lines and high expenditure or cost. Besides, in the present state of the art, the controlled devices tend to be implemented in more and more miniaturized size and disposed with a high density, as a result of which difficulty is encountered in making access to these devices because of limitation in the available space, rendering the wiring more complicate and troublesome.

As a typical example of the control/supervisory signal transmission system known heretofore, there can be mentioned such a system in which the control station and the controlled devices are interconnected by a power transmission line adapted to transmit electric power to the controlled devices with data or information signals being superposed thereon and a ground potential line. Reference may be made to, for example, Japanese Patent Publication No. 4239/1986. This transmission system however suffers from problems in that a lot of time is taken for the transmission or transfer of data or information signal between the control station and a plurality of the controlled devices and that a mechanism for detecting addresses is required because address information, each consisting of plural bits, is contained in the information signals as transferred.

DESCRIPTION OF COPENDING APPLICATION SER. NO. 237,387, now U.S. Pat. No. 4,937,568

As attempts for solving the problems of the prior art control/supervisory signal transmission systems such as described above, one of the inventors of the present application has developed through cooperation with another inventor improved signal transmission systems which are disclosed in U.S. patent application Ser. No. 237,387 filed under the title "REMOTE CONTROL SYSTEM OF SERIAL/PARALLEL CONVERSION TYPE" on Aug. 26, 1988 (U.S. Pat. No. 4,937,568) and U.S. patent application Ser. No. 241,019 filed under the title "SERIAL TRANSMISSION SYSTEM OF PARALLEL SENSOR SIGNAL" on Sep. 2, 1988 (abandoned in favor of application Ser. No. 241,019 filed Sep. 25, 1990), respectively, which are assigned to the assignees of the present application, and the whole disclosures of which are herein incorporated by reference. In these systems, the control signal or the supervisory signal is transmitted together with a clock signal by making use of a single power transmission line which is inherently defined to transmit electrical power for driving the controlled devices, whereby the amount of hardware for the wiring between a control station and the controlled devices as well as between the control station and individual sensors or supervisory elements can be significantly reduced.

For having a better understanding of the invention, the remote control system of serial/parallel conversion type disclosed in U.S. patent application Ser. No. 237,387 will be described by reference to FIG. 10 of the accompanying drawings which substantially corresponds to FIG. 1 of the above identified application.

Referring to FIG. 10, a reference numeral 95 denotes a central station and a numeral 96 generally denotes a local station which comprises a start bit unit 97 and a conversion unit 98. In the central station 95, data indicating a control command is externally inputted from a controller such as a sequence controller (not shown) to a parallel-to-serial (parallel/serial) conversion circuit 951 in the form of parallel data bits through an appropriate input unit (not shown). The parallel/serial conversion circuit 951 converts the input data bits into serial signal pulses under the timing commanded by a clock signal generated by the clock signal generator (OSC) 952. The serial signal pulses as generated are inputted to the signal conversion circuit 953 together with the clock pulses. The signal conversion circuit 953 serves for the function to superpose the serial signal pulses and the clock pulses on a D.C. power. The D.C. power superposed with the serial signal pulses and the clock pulses and outputted from the signal conversion circuit 953 is then sent out onto a line 954 as a serial output signal "OUT" which has such a waveform as shown in FIG. 10 at (A).

Additionally, the signal conversion circuit 953 is so designed as to generate a start signal "START" in synchronism with the start of the pulse train superposed on the power as mentioned above. Refer to FIG. 10 at (B). The start signal is sent out onto a line 955 labeled "START". Incidentally, a reference numeral 956 denotes a ground potential line (GND).

The D.C. power outputted form the signal conversion circuit 953 thus assumes such a waveform as illustrated in FIG. 1 at (A). More specifically, a level $V_X$ represents the voltage level of the D.C. power (in volts), $V_{X/2}$ represents the voltage level corresponding to the command or control signal pulse of logic "0" level, and 0 (zero) represents the voltage level (zero volt) corresponding to the command or control signal pulse of logic "1", wherein the signals of logic "1" and "0" levels are individually in synchronism with the clock pulses.

Upon reception of the pulse-superposed power "OUT" by the local station 96 via the line 954, a load driving power restoration circuit 972 regenerates a power having a voltage level substantially equal to the level $V_x$ for energizing or driving devices or loads connected to output circuits 988, 989 by eliminating the pulse components from the input pule-superposed power. The input pulse-superposed power is also supplied to stabilized constant voltage power generating circuits or voltage converter (CV) 971 and 981, whereby a constant voltage (having a level lower than $V_x$) is generated to be supplied as the source voltage to various constituent circuits of the local station, all of which are constituted by electronic circuits of low power consumption type. The output of the load driving power restoration circuit 972 is connected to a line $V_d$ which in turn is connected to power input terminals of the output circuits 988 and 989 to which the devices or loads (not shown) to be controlled are connected. The power line $V_d$ may additionally be connected to a terminal 974 of a D.C. power supply source for emergency so that the loads can be operated even when the power supply from the central control station 95 should be interrupted for some reason. A start signal detecting circuit 973 constituting a part of the start bit unit 97 and energized by the constant voltage power supply circuit 971 detects the start signal st supplied via the signal line 955 in synchronism with a first pulse $t_1$ of logic "1" (see FIG. 10 at (A)). The detected start pulse is supplied to a signal distribution circuit 983. On the other hand, a signal extracting circuit 982 connected to the power line 954 detects the superposed data signal pulses discriminatively with regard to the pulse levels to thereby output a detected clock pulses ck and data signal pulses of logic level "1" and "0" designated generally by dt.

The clock pulse ck is supplied to the signal distributing circuit 983 to allow the logic "1" pulse of the start signal st outputted from the start signal detecting circuit 973 to be inputted to the signal distribution circuit 983, resulting in that the pulse of logic level "1" is produced from the output terminal Q1 of a first stage of the signal distribution circuit 983 to be applied to a clock input terminal CP of a latch circuit 984.

Thus, at the timing of the clock pulse ck, the first data pulse of logic "1" (pulse $t_1$ shown in FIG. 10 at (A)) inputted to a control pulse input terminal D of the latch circuit 984 is latched by the latter. As a result, an output signal is produced from an output terminal Q of the latch circuit 984 to thereby turn on the output circuit 988 which may be constituted by a switch. Consequently, the electric power generated by the power restoration circuit 972 is supplied to the device connected to the output circuit 988 to be electrically energized. The device may be solenoid of an electromagnetic valve, an electric motor, a relay or the like, although not shown.

The pulse making appearance on the line 954 at a time point $t_2$ in the pulse train illustrated in FIG. 10 at (A) is logic "0". Consequently, the pulse extracting circuit 982 produces as the outputs thereof the clock pulse ck and the data signal pulse dt of logic "0". The clock pulse ck is applied to the signal distributing circuit 983, as the result of which the data logic "1" set at the first stage of the signal distributing circuit 983 at the preceding time point $t_1$ is shifted to a second stage of the circuit 983, whereby the data signal pulse of logic "1" is generated at an output terminal Q2 to be applied to the clock input terminal CP of a latch circuit 985. This results in that the signal pulse of logic "0" outputted from the pulse extracting circuit 982 is latched and held by the latch circuit 985. At this time, no output signal is produced from the output terminal Q of the latch circuit 985. Accordingly, the output circuit 989 remains inoperative.

Simultaneously with the output of the clock pulse from the output terminal $Q_2$ of the signal distribution circuit 983, a succeeding stage start signal generating circuit 987 is driven in response to the signal appearing at an output terminal $Q_2$ of the signal distributing circuit 983, whereby the start signal is supplied to the succeeding conversion unit.

As will now be appreciated from the above description, the control data pulse train transmitted serially via the transmission line 954 undergoes serial/parallel conversion in the conversion unit 98 of the local station, whereby the output circuit 988 and 989 connected to the output side of the conversion unit 98 as well as those of the succeeding conversion unit (not shown in FIG. 10) are set to the states of "ON", "OFF", "ON", "OFF" and "OFF", respectively, in response to the control data pulse train illustrated in FIG. 10 at (A) on the assumption that three output circuits and three latch circuits are provided in the succeeding conversion unit with the signal distribution circuit being constituted i three stages. The abovementioned state is held as it is until the next control data pulse train is issued from the central station 95.

As is apparent from the above, the subject matter of U.S. patent application Ser. No. 237,387 is directed to the transmission system for transmitting the control signal from a central station to the remotely located devices to be controlled. On the other hand, U.S. patent application Ser. No. 241,019 cited hereinbefore discloses a supervisory signal transmission system for transmitting various supervisory signals to a central station for processing or evaluation of the operating states of the devices, which system is based on the concept similar to that described above by reference to FIG. 10. In brief, in the system disclosed in U.S. patent application Ser. No. 241,019, a clock signal including a series of clock pulses is supplied from a central control station to a local station which is equipped with sensors for monitoring the states of the controlled devices by way of a power transmission line in superposition on the power. In the local station, power for driving the sensors and other circuits constituting the local station are restored while extracting the clock signal. In accordance with the states of the sensors scanned at the timing of the clock pulses, voltage levels on the transmission line are modulated at the clock pulse positions such that the voltage assumes zero volts and $V_x/2$ volts in accordance with the sensor output of logic "1" (indicating the ON-state of the associated controlled device) and logic "0" (indicating the OFF-state), respectively. The voltage levels are sequentially detected in synchronism with the clock signal in the central station for evaluation or for the monitoring purpose. For more particulars, reference may be made to the above identified application.

As will be appreciated from the foregoing, when the transmission systems described above are simply combined so as to transmit both the control (data) signals and the supervisory (sensor) signals, there are required a pair of separate transmission lines, i.e. one for transmitting the control signals from the central control station to the local station and the other for transmitting the supervisory or sensor signal indicating the states of the controlled devices from the local station to the central station, which in turn means that corresponding mechanisms for generating the clock signal and the start signal in superposition to the power are required to be provided in the central station separately for the two systems, involving remarkable increase in the amount of hardware as well as complexity in the connection between the central control station and the local stations or the sensors, which of course incurs high expenditure and is disadvantageous.

Further, when a plurality of local stations are connected to the central station in the system described above, the local stations are operated on a shift basis, so to say, in which upon reception of the start signal from the preceding stage, the control signal (superposed on the power and extracted therefrom at the timing of the clock signal) is applied to the leading one of the devices to be controlled (or sensors) in each of the local stations. In this manner, the local stations as well as the individual controlled devices (or sensors) are fixedly assigned with addresses corresponding to the ordinal numbers of pulses of the clock signals, respectively. By way of example, suppose that the first local station is provided with ten devices to be controlled. Then, the first to tenth clock pulse signals supplied from the central station are sequentially applied to the devices in this order (the first clock pulse signal is in synchronism with or represents the start signal and each clock pulse signal carries control information), while the devices connected to the second local station are driven sequentially, starting from the eleventh clock pulse. Consequently, when a structural modification or reconstitution is to be performed by adding or removing the devices to be controlled (or sensors), the addresses assigned to the devices are necessarily modified correspondingly, which in turn means that the program running on a programmable controller incorporated i or connected to the central station has to be modified, thus giving rise to a problem that the system reconstitution can not easily be realized.

Besides, in the system disclosed in the preceding applications, the clock pulse signal synchronized with the start signal both generated in the central station is received by the first local station, wherein upon completion of the control of the devices belonging to the first local station, the start signal is then generated in the first local station to be supplied to the second station for starting the sequential control for the associated devices. In this manner, the start signal has to be transmitted to the local stations successively in order to supply the control information (carried by the clock pulse signals) to the local stations sequentially. Consequently, transmission lines for the start signal are required to be provided between the central station and the first local station as well as between the adjacent local stations. This means that the amount of hardware for the wiring is increased providing another disadvantage.

SUMMARY OF THE INVENTION

It is therefore an object of the present invention to provide a control/supervisory signal transmission system which is substantially immune to the problems of the prior art systems mentioned above and in which the control signal and the supervisory signal can be transmitted through a single data transmission line.

It is another object of the present invention to provide a control/supervisory signal transmission system in which reconstitution or modification of the system configuration such as addition and removal of the controlled devices and/or sensors can easily be realized.

A further object of the invention is to provide a control/supervisory signal transmission system in which the start signal line required in the prior art system can also be spared, and hardware as well as labor involved in the wiring can be reduced significantly.

In view of the above and other objects which will be apparent as description proceeds, there is provided according to a general aspect of the present invention a bidirectional control/supervisory signal transmission system for transmitting control signals from a controller to controller devices and transmitting supervisory signals from sensors monitoring the controlled devices to the controller through a common data signal line. The system comprises transmission/reception timing control apparatus which includes a timing generator for generating a timing signal, a power supply circuit for generating a power supply voltage of a predetermined constant level, a voltage conversion circuit for converting the power supply voltage into a series of pulse-like voltage signals which have a voltage level different from that of the power supply voltage and which are outputted to the data signal line under the control of the timing signal, a first unit group connected to t he controller and to the transmission/reception timing control apparatus by way of the data signal line and including a first transmitter unit connected to the data signal line for modulating the level of the serial pulse-like voltage signals with the control data supplied in parallel from the controller under the timing of the timing signal, and a first receiver units connected to the controller and to the transmission/reception timing control means by way of the common signal data line for extracting the serial supervisory signals originating in the sensors from the data signal line to thereby supply the supervisory signals to the controller in parallel, and a second unit group connected to the transmission/reception timing control apparatus and including a second receiver unit connected to the controlled devices and to the data signal line for demodulating the level of the serial pulse-like voltage signals supplied from the first transmitter unit to thereby extract the control data to be supplied to the controlled devices and a second transmitter unit connected to the sensors and the data signal line for modulating the levels of the serial pulse-like voltage signals with supervisory data signals supplied in parallel from the sensors for transmission thereof to the receiver unit.

In a preferred embodiment of the invention, each of the transmitter units and the receiver units may include a first power generating circuit for generating from the pulse-like voltage signal a power supply voltage of a constant level for electrically energizing component circuits constituting each unit, and a second power generating means for generating from the pulse-like voltage signal a power supply voltage for electrically driving the controlled devices and the sensors, respectively.

Alternatively, the controlled devices and the sensors may be electrically driven directly from the power supply circuit means of the transmission/reception timing control means by way of a power transmission line.

In a preferred mode for carrying out the invention, the first transmitter unit of the first unit group and the second receiver unit of the second unit group may be provided in a number of m (where $m>1$) in pairs, respectively, being associated in one-to-one correspondence and connected to the data signal line in a predetermined sequence in the respective unit groups. Similarly the first receiver unit of the first unit group and the second transmitter unit of the second unit group may be provided in a number of n (where $n>1$) in pairs, respectively, being associated in one-to-one correspondence and connected to the data signal line in a predetermined sequence in the respective unit groups. In this case, the associated transmitter and receiver units can be sequentially operated to transfer the control data signals and the supervisory signals for and from the respective controlled devices and sensors under the control of the timing signal.

According to another embodiment of the invention, the transmission/reception timing control apparatus may include a first start signal generator, while each f the transmitter units and the receiver units includes a second start signal generator, whereby a first pair of the associated transmitter unit and receiver unit can be triggered into transfer operation in response to the first start signal, and upon completion of operation of the first pair of the transmitter and receiver units, the second start signal generator generates the second start signal for triggering transfer operation of a succeeding pair of the transmitter unit and the receiver unit. The operation is repeated until the last pair of the transmitter and receiver units is triggered into transfer operation.

In conjunction with the above embodiment, the transmitter units and the receiver units may be connected to one another through a start signal line for carrying the second start signals, while the first start signal may be conveyed to the first pair of the transmitter and receiver units through the data signal line in a discriminable waveform. Of course, the transmission/reception timing control apparatus, the transmitter and receiver units may be connected to one another through start signal lines for carrying the start signals mentioned above.

In a further preferred embodiment of the invention, the transmitter and receiver units in the first and second unit groups may be connected to the common data signal line at arbitrarily given locations. In that case, the transmission/reception timing control apparatus includes a start signal generator for generating a start signal to be supplied to the transmitter and receiver units, respectively, in a discriminable waveform via the data signal line. On the other hand, the transmitter and receiver units may include a circuit for extracting a clock signal from the modulated pulse-like voltage signal, a counter for counting the clock signal in response to the start signal, and an address setting circuit for holding an address allocated to the associated unit. When the count value of the counter has attained a value representing the address, the associated unit starts the transmitting or receiving operation. In this case, the start line may be spared. Further, the system reconstitution or modification can be facilitated.

According to the further aspect of the invention, the control/supervisory signal transmission system may include a terminating unit installed in succession to the last stage of the units connected in a predetermined sequence within one of the first and second groups, which terminating unit includes means for generating a signal of a predetermined waveform upon completion of operations of all the units belonging to the associated group. On the other hand, the transmission/reception timing control apparatus includes a check circuit for checking the line state of the data signal line in response to the above mentioned signal.

In another mode for carrying out the invention, a plurality of the receiver units of one unit group may be allocated with a same address so that the plurality of receiver units can be operated simultaneously with one of transmitter units of the other group.

These and other objects, advantages and attainments of the present invention will become apparent to those skilled in the art upon a reading of the following detailed description when taken in conjunction with the drawings.

BRIEF DESCRIPTION OF THE DRAWINGS

In the course of the following detailed description, reference will be made to the attached drawings, in which:

FIG. 5(*b*) is a circuit diagram showing a configuration of the control (or supervisory) signal transmitter unit of the adress allocation type transmission system according to a further embodiment of the invention;

FIG. 6(*b*) is a circuit diagram showing a configuration of the control (or supervisory) signal transmitter unit of the start line type transmission system according to another embodiment of the invention;

DESCRIPTION OF THE PREFERRED EMBODIMENTS

Now, the present invention will be described in detail in conjunction with preferred or exemplary embodiments thereof by reference to the accompanying drawings.

In General

Figure 1:
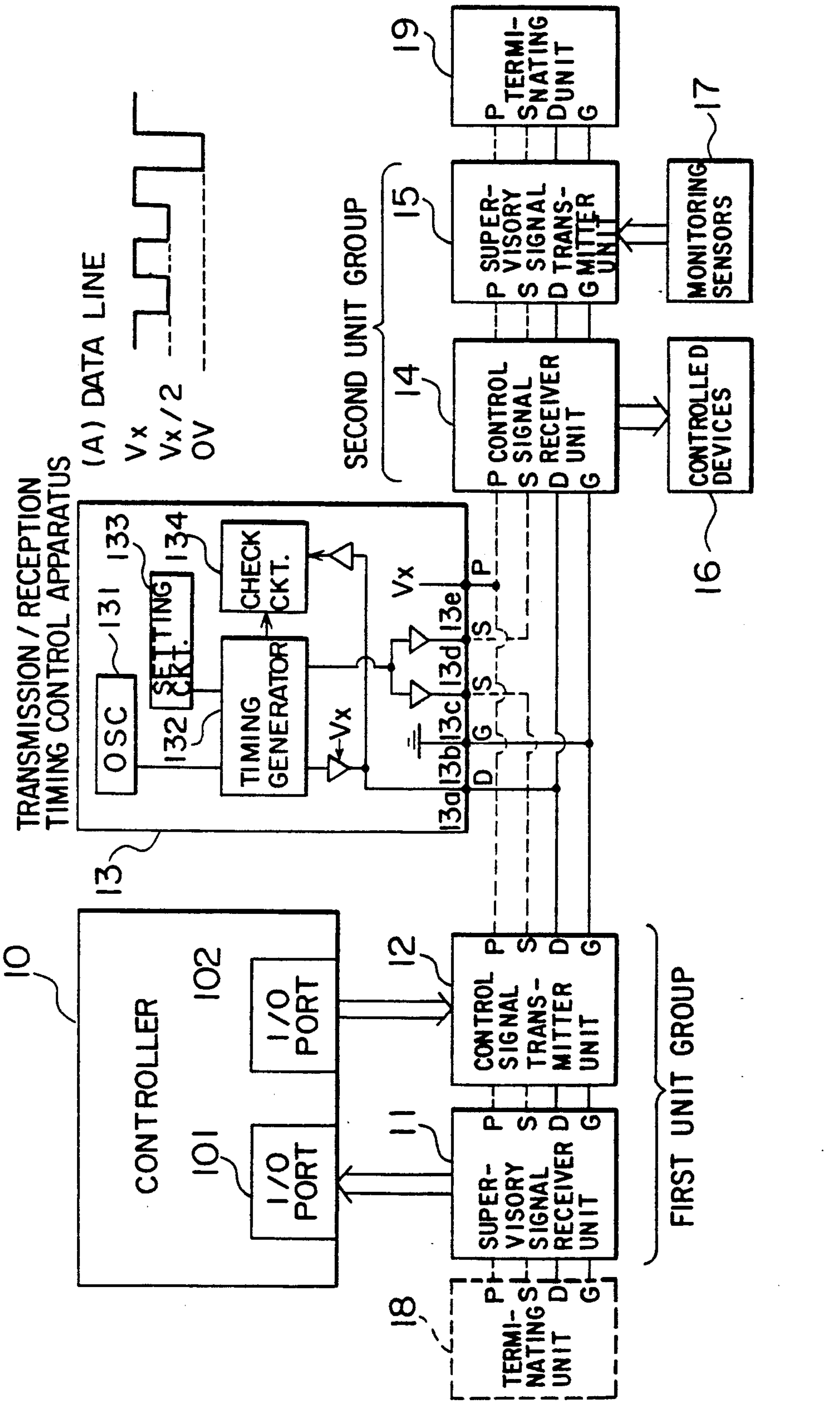
FIG. 1 is a block diagram showing a basic structure of the control/supervisory signal transmission system according to an embodiment of the present invention.

FIG. 1 is a block diagram for illustrating a basic structure of the control/supervisory signal transmission system according to an embodiment of the invention. In the figure, reference numeral 10 denotes a controller, numeral 11 denotes a supervisory signal receiver unit, numeral 12 denotes a control signal receiver unit, numeral 13 denotes a transmission/reception timing control apparatus, numeral 14 denotes a control signal receiver unit, numeral 15 denotes a supervisory signal transmitter unit, numeral 16 denotes a set of devices to be controlled (or controlled devices), numeral 17 denotes a set of monitoring sensors, and numerals 18 and 19 denote terminating units, respectively. Further, reference symbol D designates a data (information) signal line, G designates a ground potential or earth line, S designates a start line and P designates a power supply line which may be provided, if required, as described hereinafter.

Although only one supervisory receiver unit 11 is shown in FIG. 1, it should be understood that the supervisory receiver unit may be provided in a number n where $n \geqq 1$. Similarly, the control signal transmitter unit 12 may be provided in a number m wherein $m \geqq 1$.

Correspondingly, the control signal receiver unit 14 may be provided in the number m with the supervisory signal transmitter unit 15 being provided in the number n. In the following, the supervisory signal receiver unit 11 and the control signal transmitter unit 12 will also be referred to collectively as the first unit group for convenience of description. Similarly, the control signal receiver unit 14 and the supervisory signal transmitter unit 15 will also be referred to as the second unit group.

The transmission/reception timing control apparatus 13 includes an oscillator (OSC) 131, a timing generator circuit 132 for generating a clock pulse signal and a start signal, a setting circuit 133 and a checking circuit 134.

Figure 2:
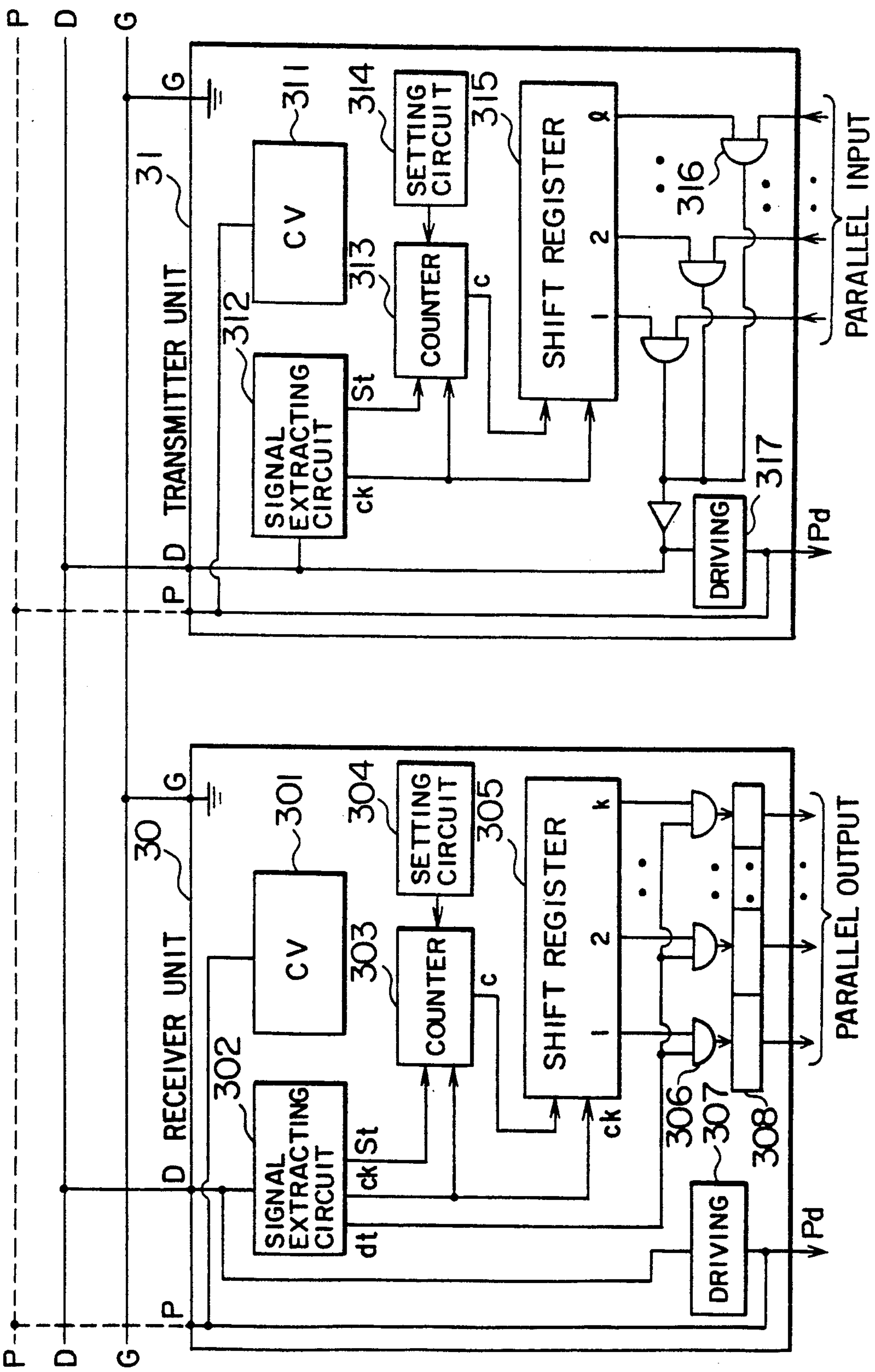
FIG. 2 is a circuit diagram showing basic structures of a control (or supervisory) signal transmitter unit and the control/supervisory signal receiver unit employed in an address allocation type control/supervisory signal transmission system according to an embodiment of the invention.

Referring to FIG. 2, which shows basic structures of the receiver unit and the transmitter unit, respectively, in the control/supervisory signal transmission system of the address allocation type according to an embodiment of the invention, a reference numeral 30 denotes the receiver unit which is representative of the supervisory signal receiver unit 11 or the control signal receiver unit 14 shown in FIG. 1 and a numeral 31 denotes the transmitter unit which may be either the control signal transmitter units 12 or the supervisory signal transmitter unit 15 shown in FIG. 1.

Figure 3:
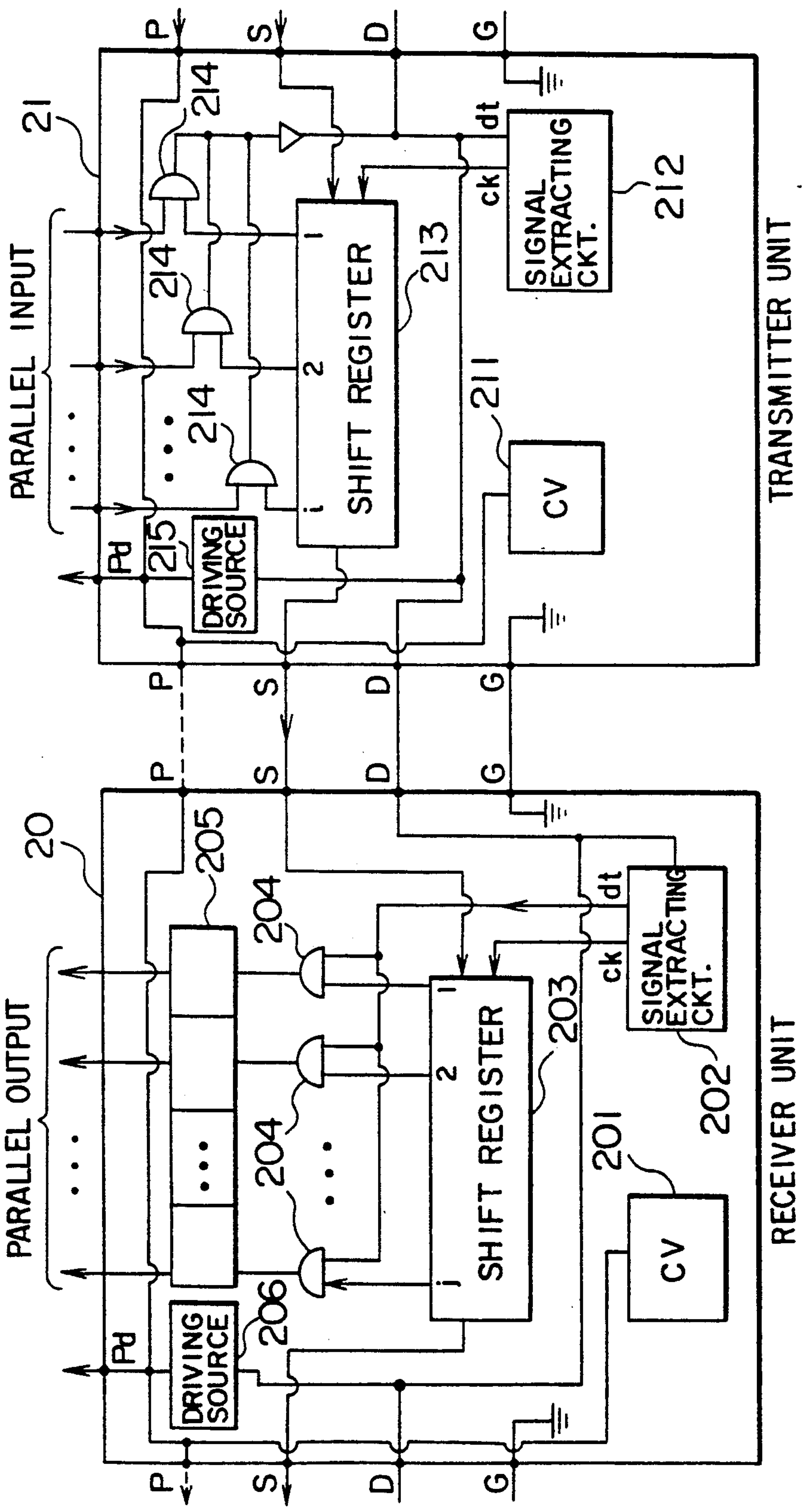
FIG. 3 shows in a circuit diagram basic circuit configurations of a control (or supervisory) signal receiver unit and a control (or supervisory) signal transmitter unit employed in a start line type control/supervisory signal transmission system according to anther embodiment of the invention.

On the other hand, basic structures of the receiver unit and the transmitter unit, respectively, in the start line type control/supervisory signal transmission system according to another embodiment of the invention are shown in FIG. 3, wherein reference numeral 20 denotes the receiver unit which corresponds to either one of the supervisory signal receiver unit 11 or the control signal receiver unit 14 shown in FIG. 1, and a numeral 21 denotes the transmitter unit representative of the control signal transmitter unit 12 or the supervisory signal transmitter unit 15 shown in FIG. 1.

According to the basic concept of the invention incarnated in the illustrated embodiments, transmission of the control signal from the controller to the controlled devices as well as transmission of the supervisory (sensor) signals from the sensors to the controller through the transmission system is performed by modulating corresponding the level of the clock pulse signal delivered as superposed on the power from the transmission/reception timing control apparatus in accordance with the logic values of "1" (ON) and "0" (OFF) of the control signal and the supervisory signal at every corresponding clock pulse position. To this end, the transmission/reception timing control apparatus includes means for generating a clock-pulse superposed power in addition to the means for generating the start signal and the ground potential (earth) signal. Basically, the supervisory signal receiver unit and the control signal transmitter unit are provided between the transmission line and the controller, while the supervisory transmitter unit is connected between the transmission line and the sensors with the control signal receiver unit being provided between the transmission line and the controlled devices.

Turning back to FIG. 1, the output signal of a clock oscillator (OSC) 131 constituting a part of the transmission/reception timing control apparatus 13 is applied to an input terminal of the timing generator circuit 132, whereby a clock signal cp having a predetermined frequency is generated and subsequently superposed on a supply voltage $V_x$ by a mixing circuit, as illustrated only conceptually, as a result of which a data/voltage signal D is produced which has a duty ratio of 50% and assumes the level $V_x$ during an earlier half of one period while assuming a level of $V_x/2$ (level of the clock pulse) during a later half. This data/voltage signal is delivered onto the data signal line D from a terminal 13*a*. Further, a ground potential signal is outputted onto the earth line G from a terminal 13*b*. Further, in the case of the start line type control/supervisory signal transmission system, a start signal (S) is delivered from the transmission/reception timing control apparatus 13 onto the start signal line S through a terminal 13*c*or 13*d* as indicated by phantom lines. On the other hand, in the case of the address allocation type control/supervisory signal transmission system, the start signal (S) is delivered onto the data signal line D in the form of a signal having a waveform different from that of the data or information carrying clock pulse signal. In the latter case, since the start signal (S) is transmitted together with the data or information signal over the data signal line D, the start signal line may be spared. For this reason, the start signal line is shown in phantom in FIG. 1.

Additionally, electric power for driving the controlled devices 16 connected to the control signal receiver unit 14 and the sensors 17 connected tot he supervisory signal transmitter unit 15 may be supplied to a power transmission line P the transmission/reception timing control apparatus 13 through a terminal 13*e*. It should be noted that this power transmission line is provided as a driving voltage supply source for driving the devices to be controlled and the sensor elements to be monitored only when these loads are of large capacity. Usually, these loads are of small capacity and for driving them, the electric power derived from the data signal line will be sufficient. In other words, the power transmission line P may be spared in dependence on the type of the devices to be controlled or the sensors. Accordingly, the power supply line P is also shown in phantom.

The data signal line D is directly connected to the receiver and transmitter units of the first and second unit groups, respectively, wherein each of the transmitter and receiver units includes a circuit for regenerating the driving power from the data signal line, a clock signal extracting circuit and a data signal extracting circuit (only in the case of the receiver units), as in the case of the transmission system of the related application (FIG. 10) described hereinbefore, although they are not shown in FIG. 1.

Figure 10:
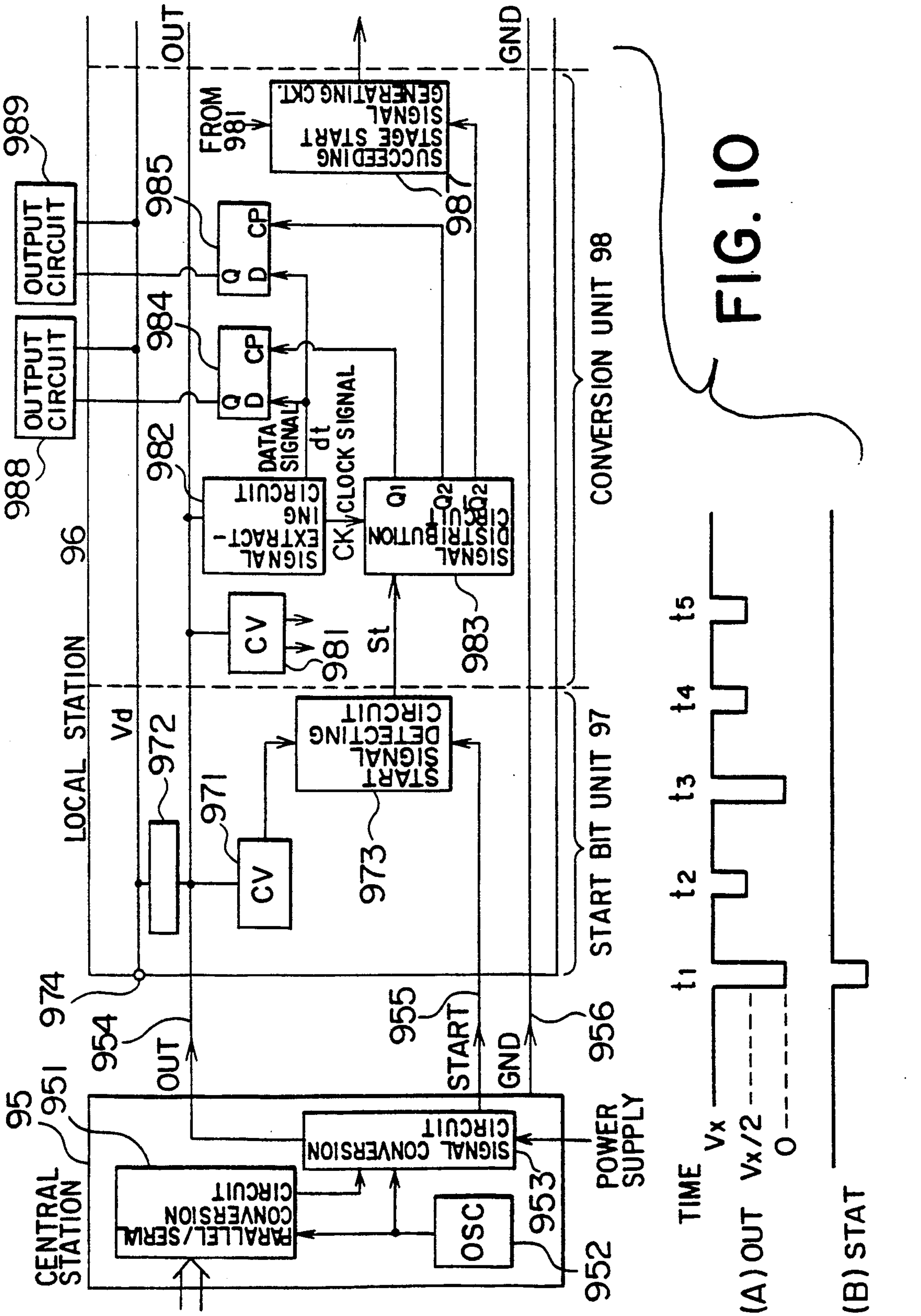
FIG. 10 is a circuit diagram showing a transmission system of copending application Ser. No. 237,387 - U.S. Pat. No. 4,937,568.

Further provided in each of the transmitter and receiver units is a shift register which corresponds to that incorporated in the signal distributing circuit 983 shown in FIG. 10 and which serves to shift sequentially the signal pulse of logic "1" in response to the start signal or trigger signal. In response to every output signal from the shift register, the transmitter unit extracts the parallel data pule signals one by one to thereby modulate the level of $V_x/2$ of the corresponding clock pulses to a voltage level of zero volt or a voltage level of $V_x/2$ volts in dependence on whether the extracted data signal is of logic "1" or "0". On the other hand, the corresponding receiver unit identifies discriminatively the levels of the clock pulses on the data signal line D in the same timing as the modulating of the clock pulse level mentioned above to thereby generate correspondingly the signals having levels of logic "1" and/or "0" to the output terminal designated by the logic "1" signal outputted from the associated shift register.

Outlining the operation of the whole system, there is previously set or placed in the setting circuit 133 of the transmission/reception timing control apparatus 13 a numerical value representing to the number of data (each corresponding to one clock) to be transmitted during one transmission period. When the start signal (a discrete signal on the start signal line or a signal superposed on the data carrying clock pulse and transmitted via the data signal line D and having a waveform differing from that of the data signal) is generated simultaneously with the outputting of the data signal from the transmission/reception timing control apparatus 13, the control signal transmitter unit 12 to which parallel control signals are inputted from the controller 10 through an input/output (I/O) port 102 selects the leading one of the plural input signals and sends it out onto the data signal line D in the form of the correspondingly modulated voltage level.

The signal on the data signal line D is extracted in the control signal receiver unit 14 selected by the start signal (S), whereby the output corresponding to logic "1" or "0" is generated to be held in the control signal receiver unit 14 and at the same time supplied to the set of controlled devices 16 to allow the corresponding one of them (not shown) to be driven when the output is logic "1" or alternatively stop operation of that one device when the output is logic "0". Similar operation is performed sequentially in response to the other control signals transmitted from the control signal transmitter 12, respectively, whereby the control signals are applied to the other corresponding output terminals of the control signal receiver unit 14, respectively, to be held thereby. It will thus be seen that the input terminals of the control signal transmitter unit 12 bear one-to-one correspondence with the output terminals of the control signal receiver unit 14. Accordingly, the number of the input terminals of the former is equal to that of the output terminals of the latter.

Now, let's assume that there is provided one control signal transmitter unit 12 in combination with one control signal receiver unit 14. On the assumption, upon completion of transmission of the control signals between the control signal transmitter unit 12 and the control signal receiver unit 14 in the manner described above, then the supervisory signal transmitter unit 15 to which supervisory or sensor signals are inputted in parallel from the associated sensors 17, respectively, is driven in response to the start signal (S) supplied from the control signal receiver unit 14 or triggered into operation by start means which is incorporated in the supervisory signal transmitter unit 15, as will be described hereinafter by reference to FIG. 2, while at the same time the supervisory signal receiver unit 11 serving to transfer the supervisory signal to the controller 10 through the I/O port 101 is driven in response to the start signal supplied from the control signal transmitter unit 12 of the preceding stage or alternatively triggered to operation by start means (FIG. 2) incorporated in the supervisory signal receiver unit 11 itself. Transmission of the supervisory signals are performed in accordance with the principle described above in conjunction with the transmission of the control signals with only difference in respect to the direction of transmission.

The supervisory or sensor signals inputted in parallel to the supervisory signal transmitter unit 15 from the sensors 17 belonging thereto are sent out serially onto the data signal line D and detected by the supervisory signal receiver unit 11 to be sequentially outputted to the held in the supervisory signal receiver unit 11. The supervisory signals are subsequently transferred to the controller 10 by way of the I/O port 101.

When the transmission of the control signals and the supervisory signals between the associated transmitter and receiver units (12, 14; 15, 11) have been completed, a number of the clock pulses are supplied to the check circuit 134 from the timing generator circuit 132. The check circuit 134 discriminatively identifies or checks the signal states on the data signal line D for every clock pulses.

The terminating unit 19 is provided at the final stage of the second unit group for detecting the clock pulse signal on the data signal line D after completion of the transmission of the control signals and the supervisory signals. Upon detection of completion of the transmission, the terminating unit 19 produces a predetermined output signal for the check purpose which is supplied to the transmission/reception control timing unit 13 to trigger operation of the check circuit incorporated therein.

Although it has been described in the above that the terminating unit 19 is provided on the side of the second unit group, it should be appreciated that the terminating unit may be provided on the side of the first unit group as shown in a phantom line and designated by the reference numeral 18 in FIG. 1. In that case, the terminating unit 19 may be spared.

FIG. 2 shows basic structures of the control or supervisory signal transmitter unit and the control or supervisory signal receiver unit employed in the address allocation type control/supervisory signal transmission system in which the start signal line S is spared, wherein the individual units are addressed by counters incorporated therein, respectively. The units are connected to at least two lines (i.e. The data signal line D and the ground potential line G) at given locations, wherein the start signal (S) is delivered from the transmission/reception timing control apparatus 13 onto the data signal line D in a waveform which differs from those of the data carrying clock pulses.

FIG. 2, a reference numeral 30 denotes a control or supervisory signal receiver unit which is representative of either the control signal receiver unit 14 or the supervisory signal receiver unit 11 shown in FIG. 1, and a numeral 31 denotes a control or supervisory signal transmitter unit which is representative of either the control signal transmitter unit 12 or the supervisory signal transmitter unit 15 shown in FIG. 1.

The units 30 and 31 includes driving power regenerating circuits 307; 317 and stabilized constant voltage generating circuits 301; 311, respectively. Each of the driving power regenerating or restoring circuits serves for regenerating a driving power $P_d$ (a voltage having a level of approximately $V_x$) from the data-superposed power signal having a waveform (D) shown in FIG. 1 and supplied via the data signal line D, the driving power $P_d$ thus derived is supplied to the controlled devices and the sensors. Further, the stabilized constant voltage regenerating circuit (CV) serves for generating a constant voltage (lower than the voltage level $V_x$) from the smoothed power $P_d$. The constant voltage thus generated is used for activating the constituent circuits of the units 30; 31. On the other hand, the signal extracting circuit 302 of the receiver unit 30 is so arranged as to extract not only the clock signal ck and the data signal dt but also to provide a start signal st by detecting the abovementioned start signal (S) which has a waveform differing from that of the clock pulse signal and which may have a level $V_x$ remaining constant over a predetermined time span. Similarly, the transmitter unit 31 includes the signal extracting circuit 312 which serves to extract not only the clock pulses ck but also the signal having the waveform differing from that of the clock signal to thereby produce a start signal st.

In operation of the control/supervisory signal receiver unit 30 shown in FIG. 2, when the signal extracting circuit 302 detects first and start signal st from the data signal line D, the start signal st is supplied to a counter 303 which responds to the start signal st by starting the counting operation for counting the clock pulses ck supplied form the signal extracting circuit 302. When the content of the counter 303 has attained a count value placed previously in a setting circuit 304, an operation start signal c of logic "1" level is produced from the output terminal of the counter 303, resulting in that the signal of logic "1" is supplied to a shift register 305. The logic "1" signal is shifted through the shift register 305 (in the rightward direction as viewed in FIG. 2) every time the clock pulse ck makes an appearance, whereby an AND circuit 306 is enabled to output or gate therethrough the data signal dt of logic "1" or "0" which is supplied from the signal extracting circuit 302. The output of the AND circuit is set at a hold circuit 308.

It is important to note than the value placed previously in the setting circuit 304 represents the address allocated to the control/supervisory signal receiver unit 30 in which the setting circuit 304 is incorporated. More specifically, when the numerical value u is set in the setting circuit 304 and when the unit 30 is provided with k output terminals, the output data signal of this unit 30 is produced at the first terminal (leftmost one of the parallel output terminals as viewed in FIG. 2) in response to the u-th clock pulse, being then followed by sequential outputting of the data pulses in response to the $(u+1)$-th to $(u+k-1)$-th clock pulses, respectively.

In a similar manner, in the case of the control/supervisory signal transmitter unit 31, a counter 313 is activated in response to the start signal st supplied from the signal extracting circuit 312 to start counting the clock pulses ck. When the content of the counter 313 has attained a value placed previously in the setting circuit 314, a signal c commanding the start of operation of the shift register 315 is outputted, being then followed by the shift operation, whereby the control signal or the supervisory signal is sent out onto the data signal line D. The numerical value placed in the setting circuit 313 represents the address allocated to the unit 31. The data signals in a number corresponding to that l of the parallel inputs are sent out onto the data signal line D.

In the above description by reference to FIG. 2, it has been assumed, by way of example, that the transmitter unit and the receiver unit are provided in one to one correspondence. It should however be understood that in the case of the address allocation type control/supervisory signal transmission system, the control signal or the supervisory signal produced by the single transmitter unit may be sent to a plurality of receiver units. More specifically, in the address allocation type control/supervisory signal transmission system in which any given one of the units connected to the data signal line can detect the start signal to count the clock pulse also derived from the data signal line D and start the transmitting or receiving operation when the number of the clock pulses as counted has attained a preset value, it is possible to allocate a same address to a plurality f reception units. Thus, a single transmitter unit is capable of outputting data to a plurality of receiver units simultaneously. Thus, a so-called multi-direction branch transmission system can be implemented with a single transmitter unit and a plurality of receiver unit in one-to-n correspondence relation.

By virtue of the system arrangement, it is thus possible to change or modify the connections between the transmitter units and the receiver units and increase or decrease the number of these units simply by modifying correspondingly the numerical values preset in the associated setting circuits, to great advantage. Moreover, the start signal line may be spared to further advantages.

FIG. 3 shows in a block diagram basic circuit configurations of the receiver unit and the transmitter unit employed in the control/supervisory signal transmission system in which the discrete start signal line S indicated in phantom in FIG. 1 is actually employed (this system is referred to as the start line type control/supervisory signal transmission system). Accordingly, in FIG. 3, the start signal line is shown in a solid line. In this figure, a reference numeral 20 denotes representatively either the control signal receiver unit 14 or the supervisory signal receiver unit 11 shown in FIG. 1, and a numeral 21 denotes representatively either the control signal transmitter unit 12 or the supervisory signal transmitter unit 15 shown in FIG. 1.

In the case of this transmission system, the individual transmitter units and receiver units are interconnected sequentially through the data signal line D, the start signal line S and the ground potential lines G, respectively. In each of the first and second units groups, the leading transmitter unit and the receiver unit which are driven at first are connected to the transmission/reception timing control apparatus 13. The power supply line P may also be provided, when occasion requires, as indicated by a phantom line in FIG. 3. In that case, the number of the lines is four in total.

The transmitter unit 21 includes a driving power regenerating or restoring circuit 215 for regenerating the driving power $P_d$ (a voltage having a level of approximately $V_x$) from the data-superposed power signal having a waveform (D) shown in FIG. 1 and supplied via the data signal line D, the driving power $P_d$ thus derived being supplied to the controlled devices 16. Further, a stabilized constant voltage regenerating circuit or voltage converter (CV) 211 is provided for generating a constant voltage (lower than the voltage level $V_x$) from the smoothed power $P_d$. The constant voltage thus generated is used for driving the constituent circuits of the transmission unit 21.

As described hereinbefore in conjunction with FIG. 1, when the controlled device driving power $P_d$ is derived from the data signal line D, there may arise such a situation in which the power $P_d$ is insufficient for driving the controlled devices or sensors particularly when they are provided in a large number or when the overall capacity of them is excessively high. In that case, the electric power may be separately supplied to the controlled devices (or sensors) via the inherent power transmission line P provided separately. At that time, the driving power regenerating circuit 215 may be spared.

The start signal (S) supplied via the start signal line S from the transmission/reception timing control apparatus 13 (FIG. 1) or from the unit of the preceding stage provided on the right-hand side, as viewed in FIG. 3, is applied to an input terminal of a shift register 213 and set at a first stage thereof in response to the clock pulse ck extracted from the data signal line D through the signal extracting circuit 212. Thus, a logic "1" signal makes appearance at the output 1 of the first stage of the shift register 213 to be applied to one input of an AND circuit 214. Consequently, a signal level corresponding to the first input signal supplied to the transmitter unit 21 from the controller (10 in FIG. 1) (or a sensor) at this time point is outputted from the AND circuit 214 onto the data signal line D. Subsequently, under the timing of the next clock pulse ck, the logic "1" is shifted through the shift register 213, which results in that a logic "1" output is generated from the output terminal 2 of the second stage of the shift register from the leftmost one, whereby the signal level corresponding to the second input signal is outputted onto the data signal line D. Through the similar process, the inputted parallel signal is converted into the serial signal to be outputted onto the data signal line D in the form of the discriminable levels or amplitudes assumed by the individual clock pulses. Upon completion of the parallel-to-serial conversion, the start signal (S) is generated from the final stage of the shift register 213 to be supplied to the adjacent receiver unit 20.

The receiver unit 20 which may be either the control signal receiver unit 14 or the supervisory signal receiver unit 11 shown in FIG. 1 includes a driving power regenerating circuit 206, a stabilized constant voltage generating circuit (CV) 201 and a signal extracting circuit 202, as in the case of the transmitter unit 21 described above, wherein the signal extracting circuit 202 serves to extract the clock signal ck from the data signal line D and at the same time extract data signal dt of logic "1" or "0" by discriminating signal supplied from the other transmitter unit.

The receiver unit 20 further includes a shift register 203 which is so connected as to receive the start signal (S) from the transmitter unit of the preceding stage and at the same time receive the clock signal ck from the signal extracting circuit 202, to thereby output logic "1s" sequentially from the individual stage output terminals thereof.

Consequently, the AND circuit 204 is enabled in response to every output pulse of logic "1" applied to one input thereof from the shift register 203 to thereby produce the output pulses corresponding to logic "1" and "0" of the data signal (discrimination output signal) delivered from the signal extracting circuit 202. The output pulses from the AND circuit 204 are inputted sequentially to a hold circuit 205 to be held therein. In this manner, the serial-to-parallel conversion is effectuated, the result of which is held in the hold circuit 205 till the next cycle.

Detailed Description

Figure 4:
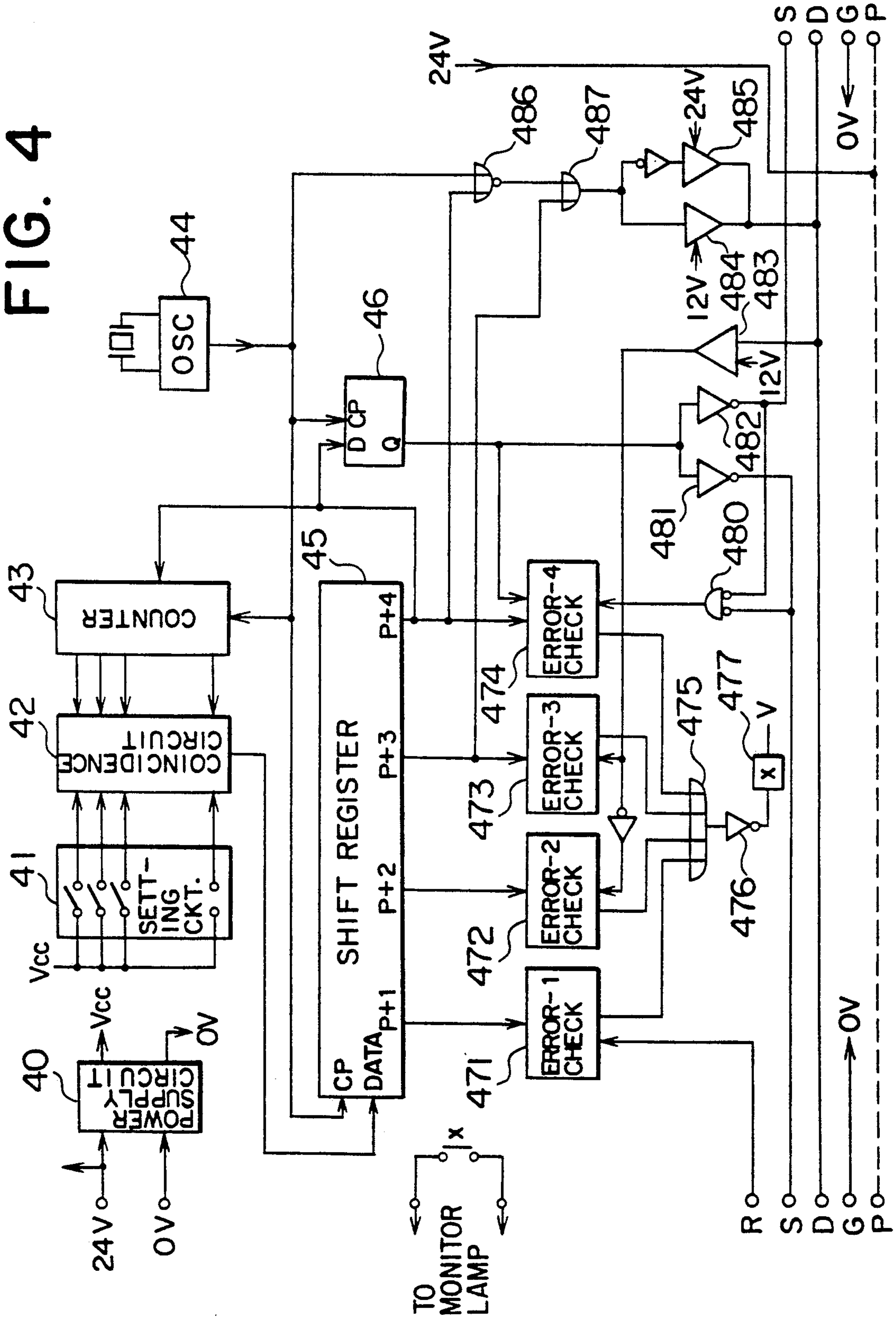
FIG. 4 is a circuit diagram showing a structure of a transmission/reception timing control apparatus according to an embodiment of the invention.
Figure 6A:
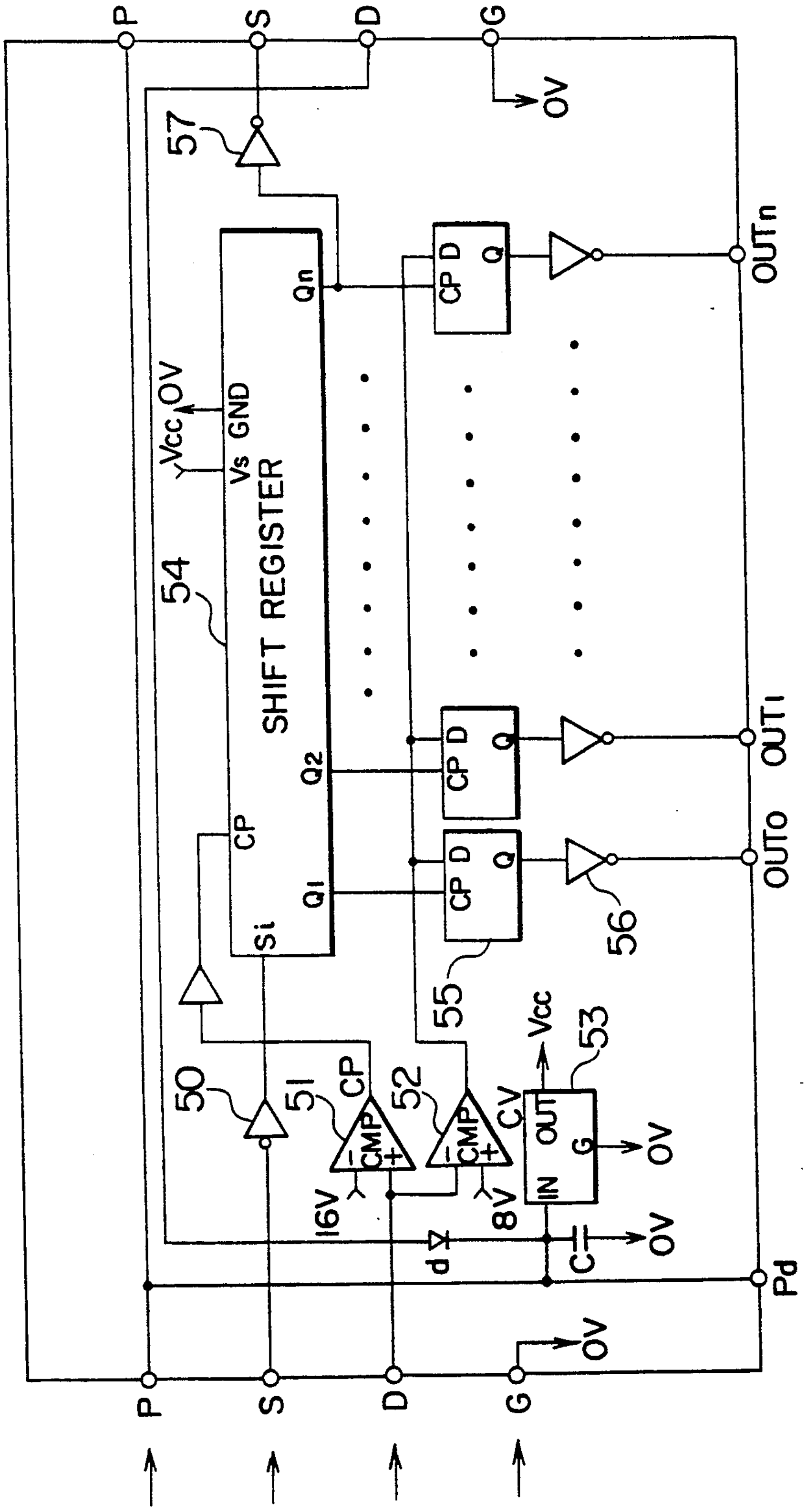
FIG. 6(*a*) is a circuit diagram showing a configuration of the control (or supervisory) signal receiver unit of the start line type control/supervisory signal transmission system according to an embodiment of the invention.
Figure 6B:
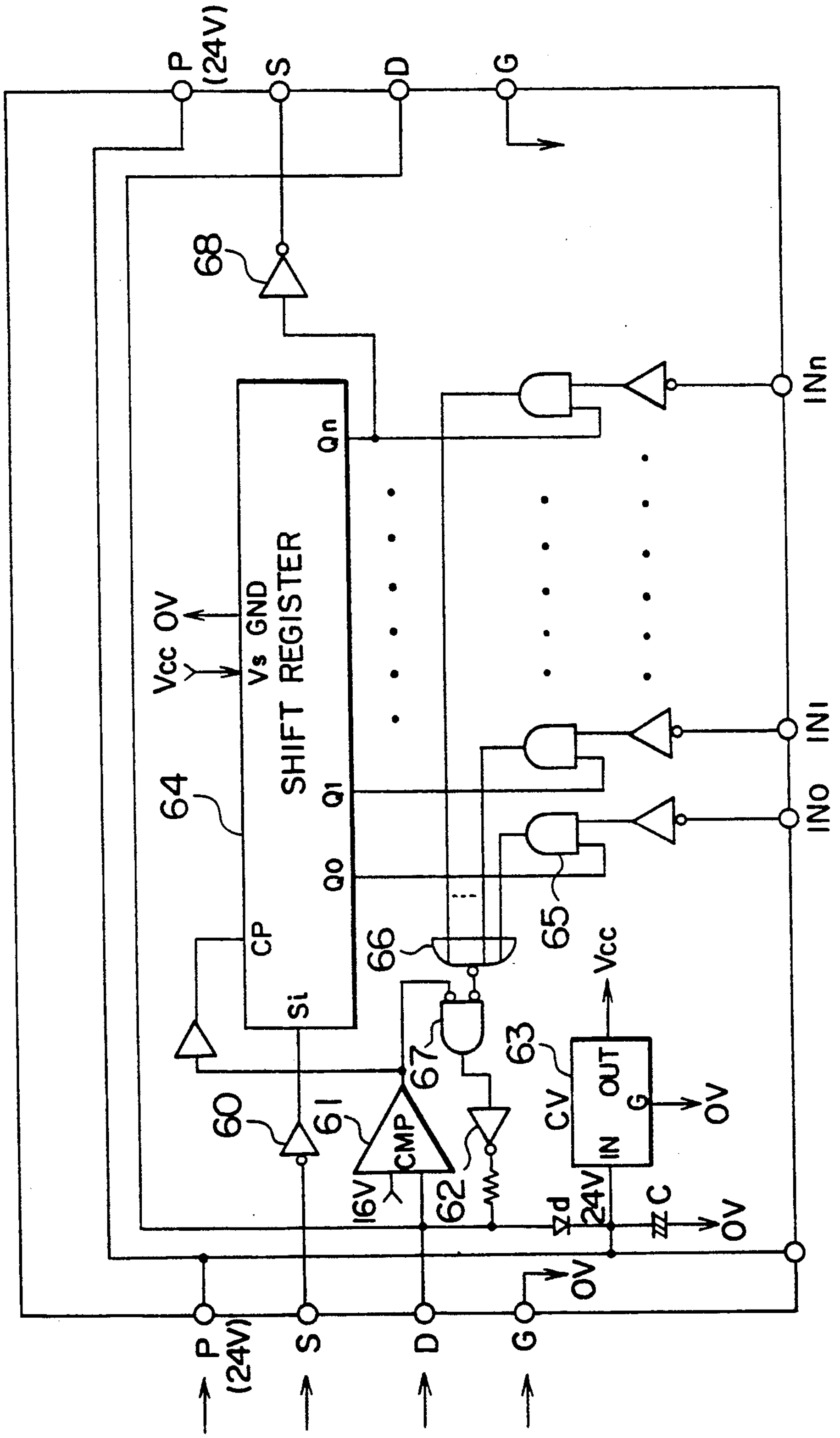
Figure 7:
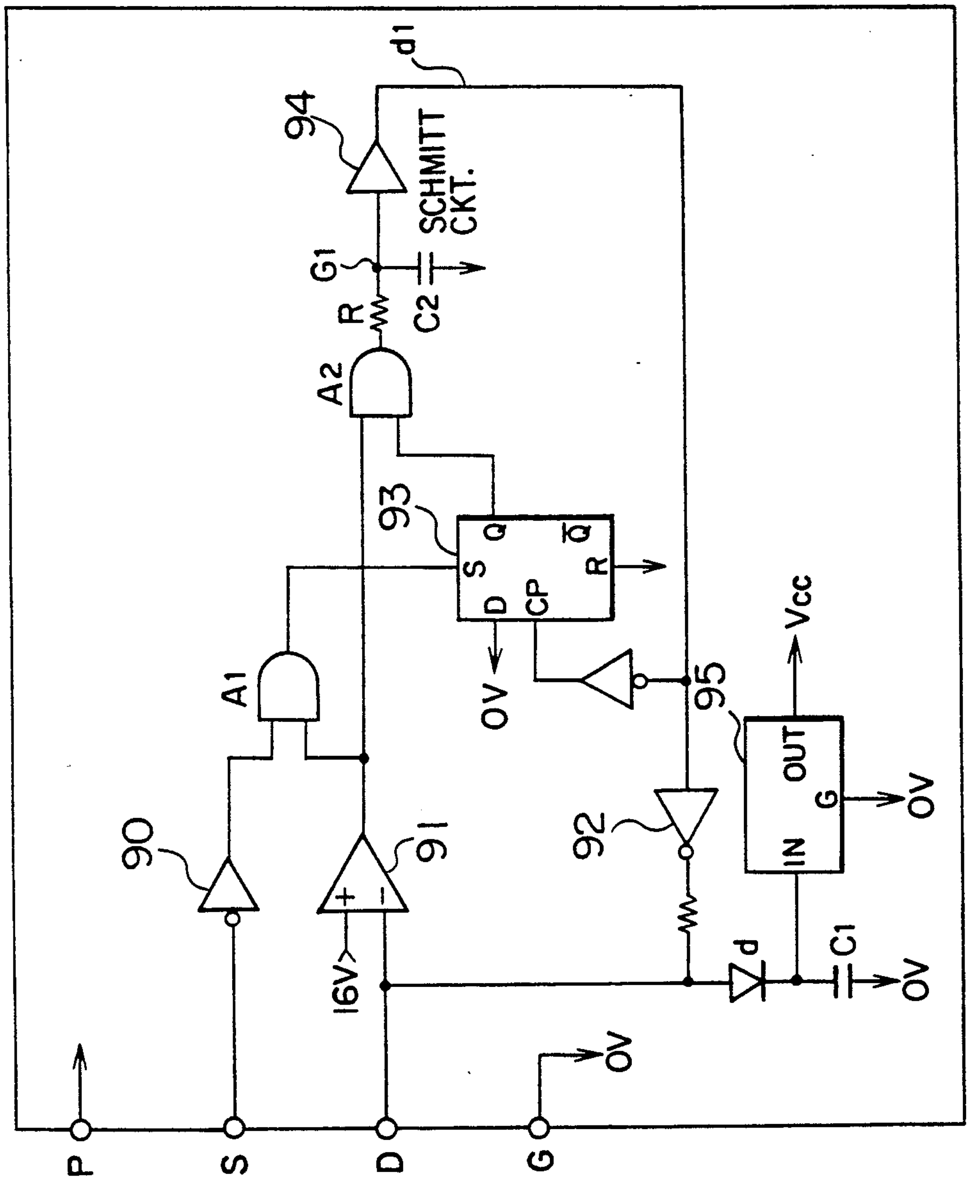
FIG. 7 is a circuit diagram showing a structure of a terminating unit employed in the transmission system.
Figure 8A:
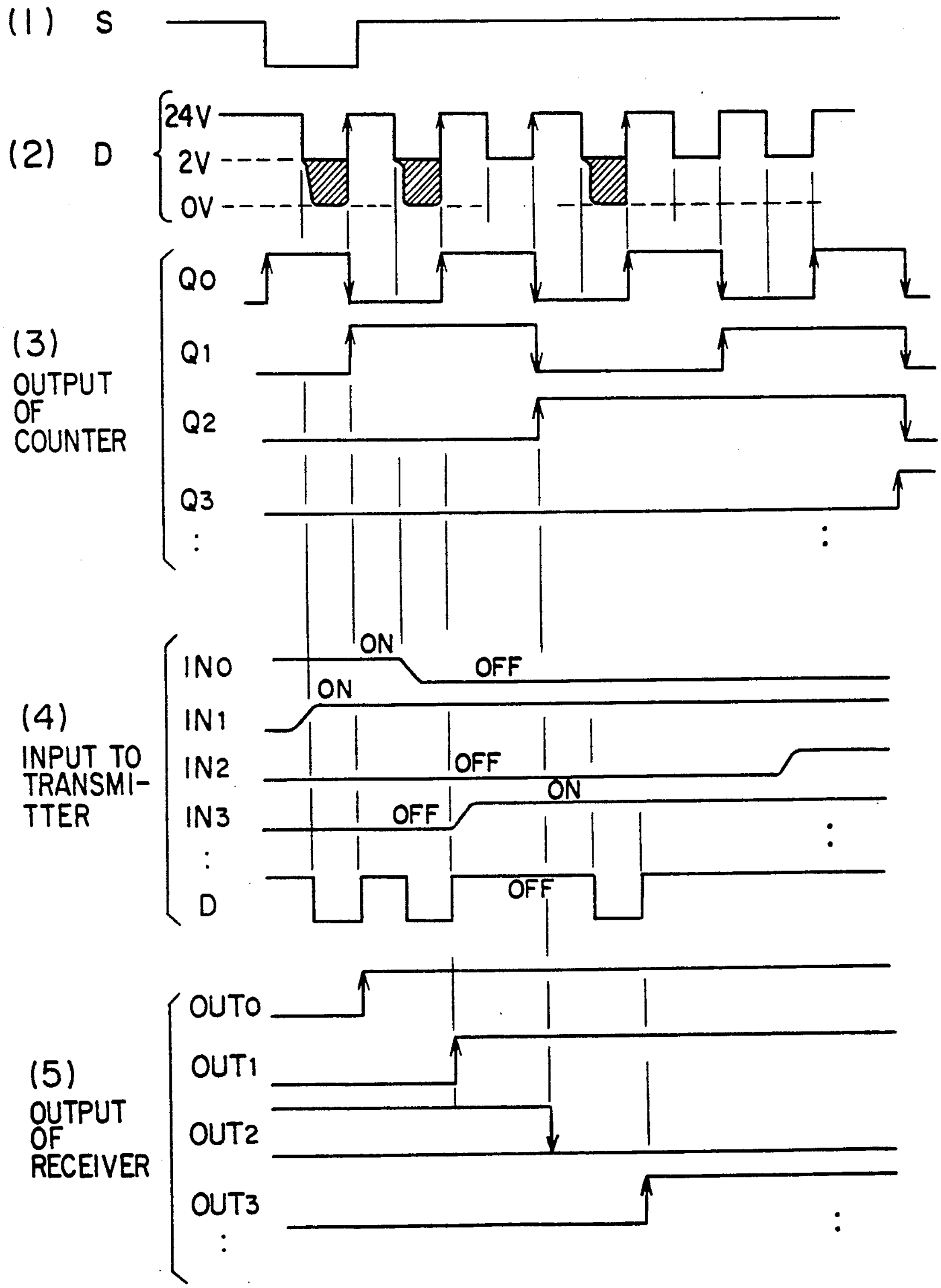
FIGS. 8(*a*) and 8(*b*) are timing charts for illustrating operations of the control/supervisory signal transmission system.
Figure 8B:
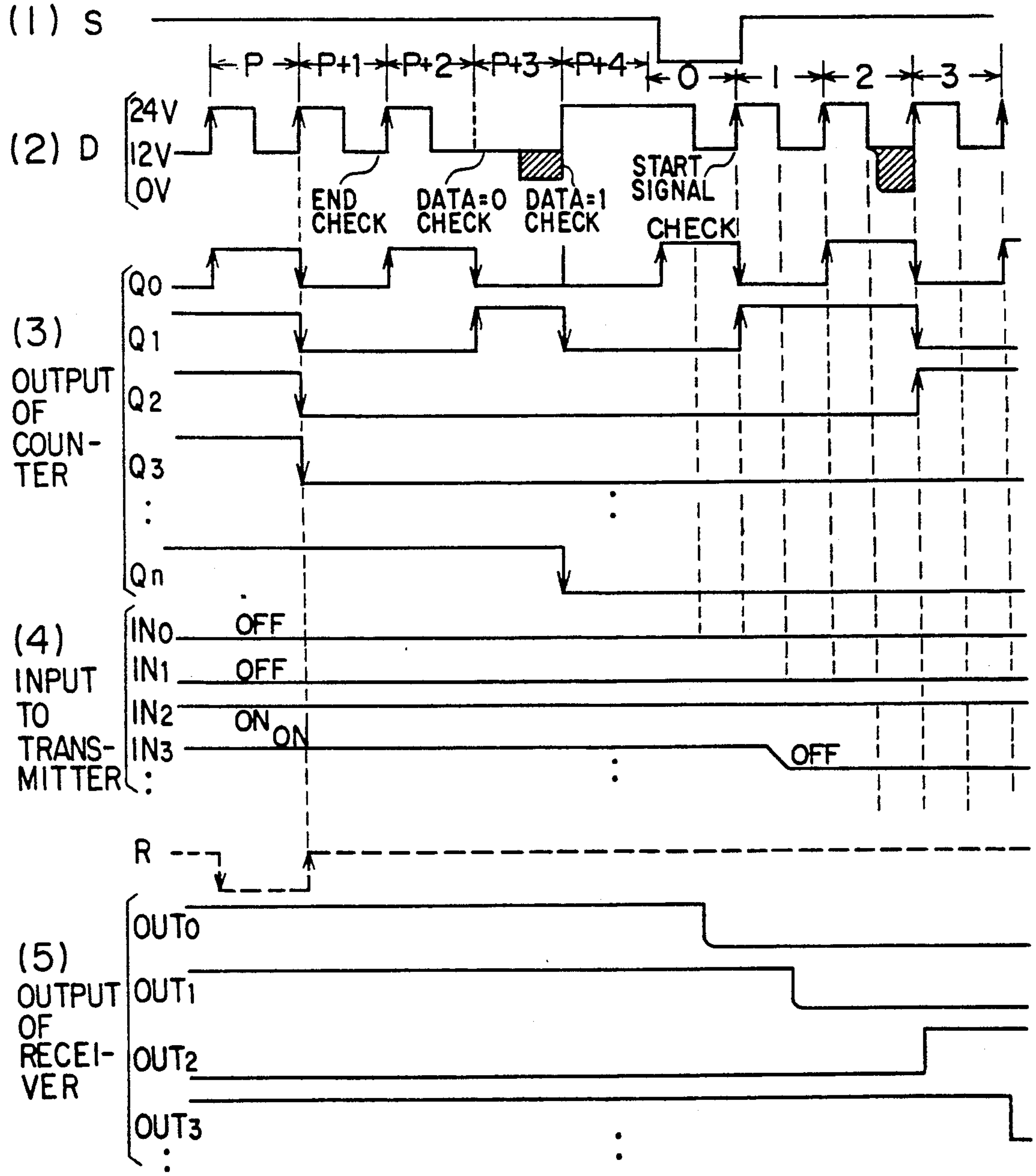
Figure 9:
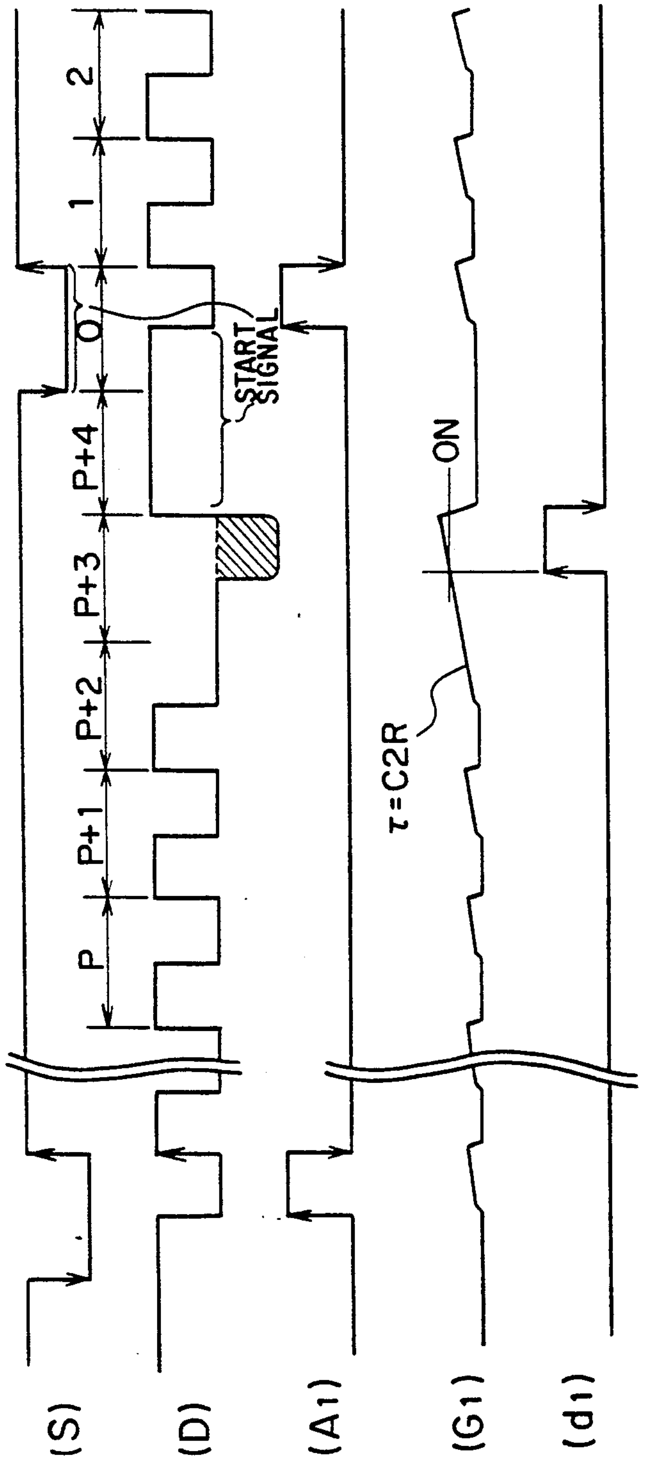
FIG. 9 is a timing chart for illustrating operation of the terminating unit.

In the following, description will be made in detail of the transmission/reception timing control apparatus, the control/supervisory signal receiver and transmitter units of the address allocation type transmission system, the receiver and transmitter units of the start line type transmission system and the terminating unit in this order by reference to FIGS. 4 to 9, in which FIG. 4 is a circuit diagram showing a structure of the transmission/reception timing control apparatus according to an embodiment of the invention, FIG. 5(*a*) is a circuit diagram showing a configuration of the control or supervisory signal receiver unit employed in the address allocation type control/supervisory signal transmission system, FIG. 5(*b*) is a circuit diagram showing a configuration of the control or supervisory signal transmitter unit employed in the address allocation type transmitter system, FIG. 6(*a*) is a circuit diagram showing a configuration of the control or supervisory signal receiver unit employed in the start line type control/supervisory signal transmission system, FIG. 6(*b*) is a circuit diagram showing a configuration of the control or supervisory signal transmitter unit employed in the start line type transmission system, FIG. 7 is a circuit diagram showing a structure of the terminating unit, FIGS. 8(*a*) and 8(*b*) are timing charts for illustrating operations of the control/supervisory signal transmission system, and FIG. 9 is a timing chart for illustrating operation of the terminating unit.

Now, the structure and operation of the transmission/reception timing control apparatus (denoted by a numeral 13 in FIG. 1) will be described in detail by referring to FIG. 4 in combination with FIGS. 8(*a*) and 8(*b*).

In FIG. 4, a reference numeral 40 denotes a power supply circuit which is connected to an external power supply line of, for example, 24 volts and which generates a source voltage to be supplied to the individual electronic circuits constituting the transmission/reception timing control apparatus. The data signal line D is also supplied with a voltage of 24 volts (corresponding to $V_x$ shown in FIG. 1) from this power supply circuit.

A reference numeral 44 denotes an oscillator (designated by 131 in FIG. 1) for producing the clock pulses which are supplied to a counter 43, a shift register 45, and a flip-flop circuit 46, as can be seen in the figure. The counter 43 starts counting the clock pulses, starting from the pulse representing the start signal as well. The number of the clock pulses required for transmission of the data signal is placed in a setting circuit 41. When the count value in the counter 43 coincides with the pulse number set in the setting circuit 41, a coincidence circuit 42 produces an output of logic "1" which is supplied to the shaft register 45 through a terminal labeled "DATA".

The shift register 45 produce timing signals at terminals (p+1) to (p+4) sequentially for checking the line states (e.g. short-circuited state). In response to these timing signals, error check circuits 471 to 474 check the line states. The function of the error check circuit will hereinafter be described in more detail in conjunction with the terminating circuit (shown in FIG. 7). At the timing of the last output (p+4) of the shaft register 45, the counter 43 is cleared, whereon the counting for the next period is started. Refer to FIG. 8(*b*) at (2).

The output of the oscillator 44 is also supplied to amplifier circuits 484 and 485, respectively, through a NOR circuit 486 and an OR circuit 487. The amplifier circuit 484 is supplied with a voltage of 12 volts through other input terminal while the amplifier 485 is supplied with a voltage of 24 volts through other input terminal. Upon being driven, these amplifier 484 and 485 produce at respectively outputs the voltage of 12 volts and 24 volts, respectively, wherein the voltage of 24 volts is superposed with the clock pulses in such a manner as illustrated in FIG. 8(*a*) at (2) and sent out onto the data signal line D.

Further provided are a NOR circuit 486 and an OR circuit 487 which cooperate to generate the start signal having a waveform in which a level of 24 volts continues to be constant for a predetermined duration (e.g. for a period 1.5 times as long as that of the clock pulse signal) in the case of the address allocation type transmission system. As the start signal, the outputs (p+3) and (p+4) of the shift register 45 are made use of. Refer to FIG. 8(*b*) at (2) labeled "D Line".

In the case where both or one of the first unit group and the second unit group (see FIG. 1) includes the start line type transmission/reception units (connected to the data signal line D, the ground potential line G and the start signal line S), a structure for supplying the start signal to the start signal line is adopted. More specifically, when the output (p+4) is produced from the final stage of the shift register 45, the flip-flop circuit 46 produces the signal of logic "1" over one period of the clock signal, as a result of which the start signal having a level of zero volts remaining constant during one period of the clock signal is generated by drivers 481 and 482. The waveform of this start signal is illustrated in FIG. 8(*a*) at (1) and FIG. 8(*b*) at (1) labels "S Line".

Since the voltage of 24 volts is superposed with the data signal (D) outputted from the transmission/reception timing control apparatus, each of the units can regenerate the electric power from the data signal line D for driving the controlled devices and the sensors. However, when the load is of large capacity, the power line of 24 V may be extended from the transmission/-reception timing control apparatus to the individual transmitter and receiver units, the controlled devices and the sensors, respectively, as occasion requires. It should however be noted that the power line P of 24 volts is not indispensable.

Next, referring to FIGS. 5(*a*) and 5(*b*), the address allocation type receiver and transmitter units will be described. It should be recalled that these unit operate in accordance with the principle described hereinbelow in conjunction with FIG. 2.

Figure 5A:
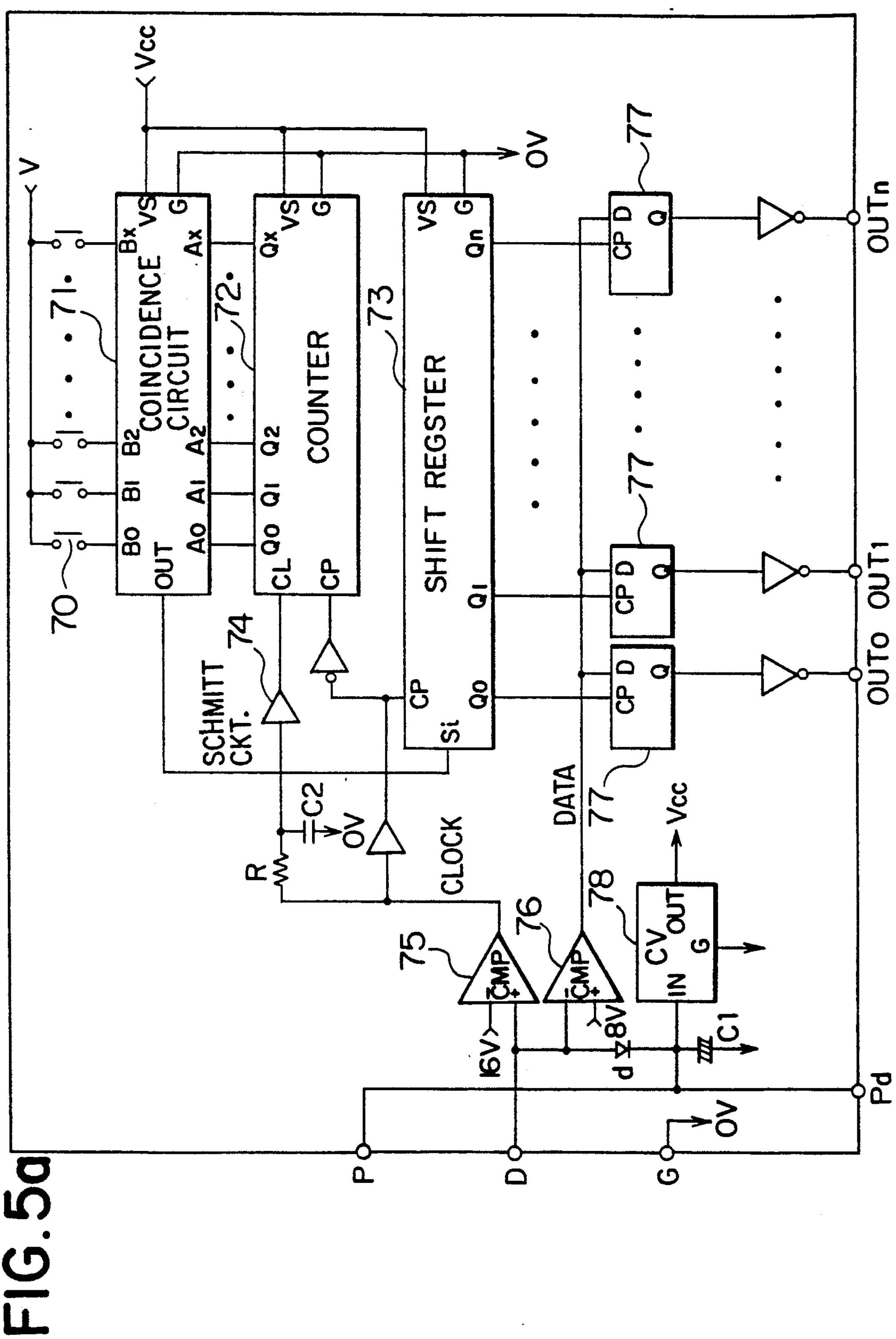
FIG. 5(*a*) is a circuit diagram showing a configuration of the control (or supervisory) signal receiver unit of the address allocation type control/supervisory signal transmission system according to an embodiment of the invention.
Figure 5B:
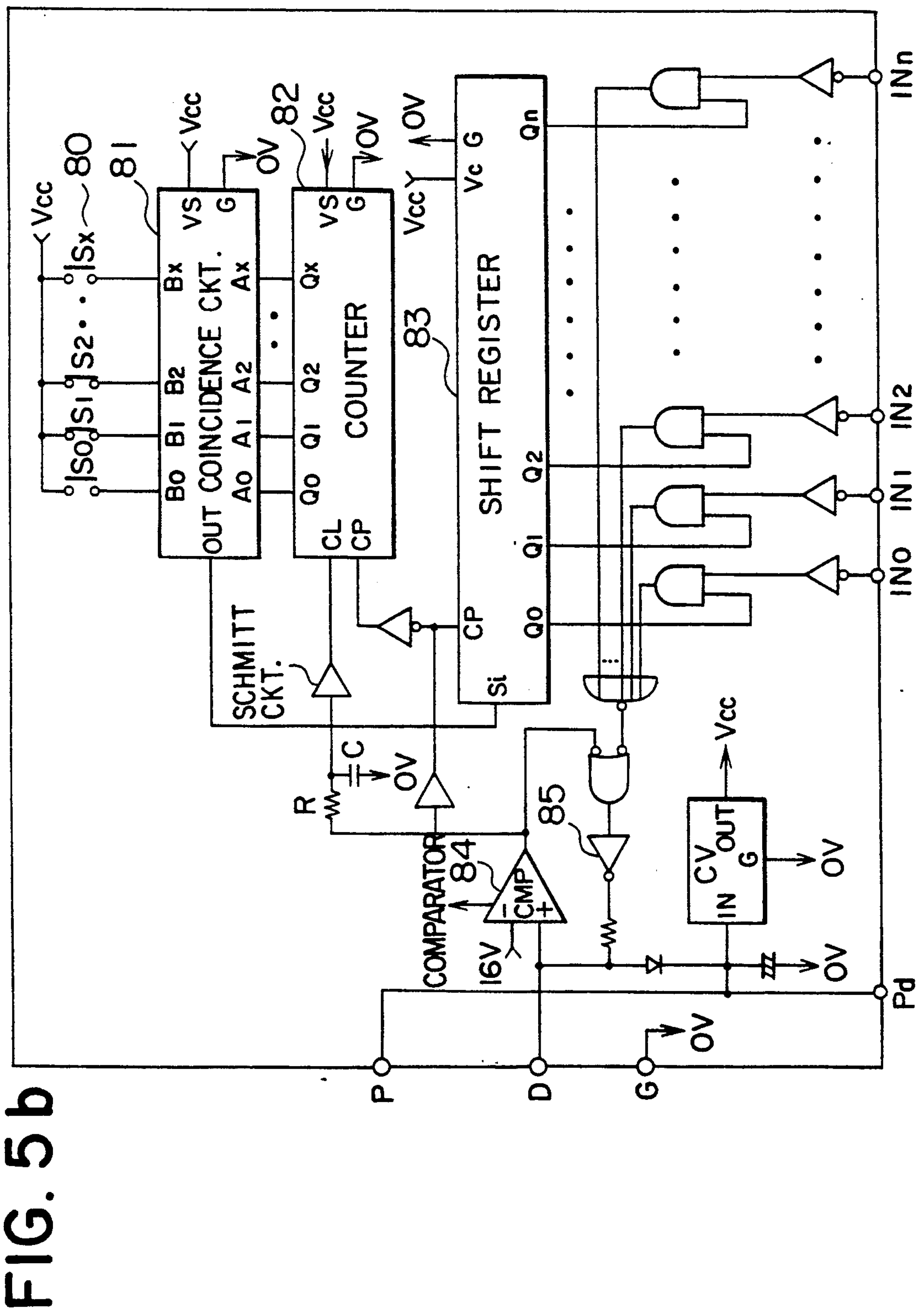

The control or supervisory signal receiver unit shown in FIG. 5(*a*) is provided with terminals D, G and P connected to the common data signal line D, ground potential line G and power line P (provided if necessary) and includes the circuits for regenerating a source voltage of 24 volts from the data signal line D, the voltage converter (CV) for generating the stable voltage $V_{cc}$ for driving the electronic circuits constituting the transmitter unit, the circuit for extracting the clock pulses, the comparator for identifying discriminatively the data signal and others, as described hereinbefore. In the case of the address allocation type transmission system, the individual receiver units may be installed at positions selected arbitrarily, because no relation is previously established between the positions at which the units are to be installed and the addresses to be allocated to the units.

More specifically, in the address allocation type receiver unit, a smoothed source voltage of about 24 volts is regenerated from the data signal line D through a filter circuit constituted by a capacitor $c_1$ and a diode d and coupled to the power line D and at the same time to the driving voltage terminal $P_d$. Further, the stabilized constant voltage generator or voltage converter (CV) 78 converts the voltage of 24 volts to a lower stabilized voltage $V_{cc}$ for driving the electronic circuits constituting the unit. The clock pulses are extracted through a comparison circuit 75, while the data signal is extracted through a comparison circuit 76.

Upon application to a corresponding input terminal of the receiver unit from the data signal line D the start signal of 24 volts generated by the transmission/reception timing control apparatus shown in FIG. 4 and having a period 1.5 times as long as that of the clock pulse, a detection signal is produced by the comparator 75 through comparison of the input voltage with a reference voltage of 16 volts. Subsequently, the detection signal is supplied to a time constant circuit constituted by a resistor R and a capacitor $c_2$, whereby the duration of the detection signal determined in respect to the duration. When the duration of the detection signal exceeds a preset time, a Schmitt circuit 74 produces an output signal which serves to clear a counter 72. Consequently, the clock pulses succeeding to the one detected by the comparator 75 are counted by the counter 72.

The count operation of the counter 72 is illustrated in FIG. 8(*a*) at (3). On the other hand, a predetermined address allocated to the instant receiver unit is preset in an address setting circuit 70. The count value of the counter 72 is compared with the preset address value in a coincidence circuit 71. When the count value has attained the preset address value, the coincidence circuit 72 produces a coincidence output signal from a terminal OUT thereof, the coincidence output signal being then inputted to a shift register 73 through a terminal $S_i$, whereupon operation of the receiver unit is started. More specifically, in the shift register 73, the logic "1" signal is shifted in response to the clock pulses appearing in succession to the logic "1" signal, whereby the logic "1" signal is outputted sequentially from output terminals $Q_0$, $Q_1$, $Q_2$, . . . $Q_n$ of the shift register 73, as a result of which data of logic "1" and/or "0" of the data signal extracted through the comparator 76 are latched and held by the corresponding flip-flops 77, respectively. In response to the output from the final stage $Q_n$ of the shift register 73, the data output operation to the controller (10 in FIG. 1) or the devices to be controlled (16 in FIG. 1) is performed.

In conjunction with the address allocation type reception unit, it should be noted that a same address may be assigned to a number of the receiver units and placed in the respective setting circuits 70. In that case, a single data supplied from one transmitter unit and making appearance on the data signal line may be transferred to a plurality of receiver units in parallel. In this manner, it is possible to control the devices installed at plural different locations with a single control signal. In that case, the one transmitter unit may be of either the address allocation type or the start line type.

Referring to FIG. 5(*b*), the address allocation type transmitter unit is so arranged that upon detection of the start signal having a predetermined waveform (solely or simultaneously with other transmitter units), a counter 82 starts the operation of counting the clock pulses. When the count value has attained a numerical value stored in a setting circuit 80 and representing the address allocated to the instant transmitter unit, a coincidence circuit 81 produces a coincidence detection signal to which a shift register 83 responds by starting the operation of shifting the logic "1" pulse, as described hereinbefore by reference to FIG. 5(*a*). Thus, the data signals of logic "1" and/or "0" inputted to individual input terminals $IN_0$ to $IN_n$ from the controller (in case the transmitter unit is the control signal transmitter unit) or the sensors (in case the transmitter unit is the supervisory signal transmitter unit) are detected to vary correspondingly the levels of the corresponding clock pulses on the data signal line D. In this way, the data signal representing the control signals originating in the controller or the supervisory signals originating in the monitoring sensors are transmitted to the devices to be controlled or to the controller through the associated receiver units, respectively.

Next, referring to FIG. 6(*a*) and 6(*b*), description will be made of the transmitter unit and the receiver unit employed in the start line type control/supervisory signal transmission system. First, it should be recalled that these units operate in accordance with the principle described hereinbefore by reference to FIG. 3.

In FIG. 6(*a*), the receiver unit is connected to the transmission/reception timing control apparatus (13 in FIG. 1) or the transmitter unit of the preceding stage (not shown) provided on the left-hand side through the start signal line S, the data signal line D, the ground potential line G and the power line P (constituting a power supply source for driving the controlled devices or sensors). A smoothed voltage of about 24 volts is derived from the data signal line D through a filter circuit constituted by a capacitor c and a diode d and coupled to the power line P and at the same time to the terminal $P_d$ for driving the controlled devices or monitoring sensors. A voltage converter (CV) 53 is also supplied with the voltage of 24 volts to thereby produce a stabilized voltage $V_{cc}$ for driving the electronic circuits such as the shift register and other which constitute the receiver unit.

Further, the clock pulses (having amplitude level of 12 volts or about zero volt) is extracted from the data signal line D through comparison with a voltage signal of 16 volts by a comparator 15, wherein the clock pulses cp as extracted are supplied to one input terminal CP of a shift register 54. On the other hand, the data signal superposed with the clock pulses is extracted from the data signal line D and compared with a voltage of 8 volts by a comparator 52 which produces logic "1" signal (ON signal) when the data signal is about zero volt and otherwise produces logic "0" signal (OFF signal).

The start signal supplied from the start signal line S is applied to an input terminal $S_i$ of the shift register 54 through an amplifier 50, whereupon logic "1" signal is generated from the first stage of the shift register 54, which is then followed by shifting of logic "1" to the succeeding stage of the shift register. The logic "1" signal mentioned above is inputted to an associated flip-flop circuit 55, whereby a signal corresponding to logic "0" or "1" of the data signal identified by the comparator 52 is held by the flip-flop circuit 55. In this manner, all the flip-flop circuits 55 are loaded with the data corresponding to the data signal carried by the data signal line D.

Thus, upon appearance of the signals having waveforms illustrated in FIG. 8(*a*) at (4), the flip-flop circuits 55 produce the output signals $OUT_0$ to $OUT_n$ having waveforms illustrated in FIG. 8(*a*) at (5). These output signals are utilized for controlling the controlled devices connected to the output terminals labeled $OUT_0$ to $OUT_n$ through drivers 56, respectively, in case the receiver unit is connected to the controlled devices, as in the case of the control signal receiver unit 14 shown in FIG. 1 while the output signals $OUT_0$ to $OUT_n$ are supplied to the controller (10 in FIG. 1) straightforwardly, when the receiver unit serves as the supervisory signal receiver unit 11 shown in FIG. 1.

Produced from the final stage $Q_n$ of the shift register 54 through an inverter 57 is the start signal which is outputted onto the start signal line S leading to the succeeding unit.

Referring to FIG. 6(*b*), the control or supervisory signal transmitter unit is connected to the adjacent unit through the power line P, the start line S, the data signal line D and the ground potential line G, wherein the power line P is provided when it is required for the reasons described hereinbefore. Derived from the data signal line D through a filter circuit constituted by a capacitor c and a diode d is a smoothed voltage of about 24 volts which is coupled to the power line P and at the same time to the terminal $P_d$ for driving the controlled devices or the monitoring sensors connected to the instant transmitter unit. Further, a voltage $V_{cc}$ for activating the electronic circuits constituting the unit is derived from the voltage of 24 volts through a voltage converter (CV) 63.

The start signal supplied from the adjacent unit (connected on the left-hand side as viewed in FIG. 6(*b*)) is applied to an input terminal $S_i$ of a shift register 64 which can then be driven to perform a shift operation in response to the clock pulses extracted through a comparator 61 in the same manner as described above by reference to FIG. 5(*a*). The outputs from the individual stages $Q_1$ to $Q_n$ of the shift register 64 are applied to one inputs of associated AND circuits 65, respectively, whereby data signals $IN_0$ to $IN_n$ of logic "1" and/or "0" inputted from the controller (10 in FIG. 1) or the monitoring sensors (17 in FIG. 1) are gated through the AND circuits 65 to be sent out onto the data signal line D by way of a NOR circuit 66, an AND circuit 67 and a driver 62. Thus, the data signal as generated by this transmitter unit represents the control signal when the unit is connected to the controller while representing the supervisory signal (state detection signal) when the unit is connected to the monitoring sensors.

An example of waveform of the data signal produced in this manner is illustrated in FIG. 8(*a*) at (4). As can be seen, when the signals inputted to the terminals $IN_0$ to $IN_n$ of the transmitter unit are of such waveforms as illustrated in FIG. 8(*a*) at (4), the clock pulses on the data signal line D assume levels of 12 volts and zero volt in correspondence to logic "0" and "1" of the input data signal. In other words, the data signal of logic "1" causes the level of the corresponding clock pulse to change from 12 volts to zero volt, as indicated by hatching in FIG. 8(*a*) at (2), while the data signal of logic "0" allows the corresponding clock pulse level to remain at 12 volts.

Now, description will be directed to the terminating unit by reference to FIG. 7 and FIG. 9. The terminating unit shown in FIG. 7 is implemented in a start line type structure connected to the start signal line S, the data signal line D and the ground potential line G. Since the terminating unit is connected at the final stage, the start signal generated by the unit of immediately preceding stage is applied to a terminal labeled "S", as illustrated in FIG. 9 at (S). At that time, when a clock pulse is detected from the data signal line D by a comparator 91, an AND circuit A1 produces a pulse output, as illustrated in FIG. 9 at (A1), whereby a flip-flop circuit 93 is set, as a result of which logic "1" is outputted from an output terminal Q of the flip-flop circuit 93 to be supplied to an AND circuit A2. Subsequently, clock pulses each of a predetermined period are inputted to the AND circuit A2 at the clock timing.

So long as the clock pulses of the predetermined period are detected, the AND circuit A2 outputs logic "1" in response to the clock pulse of logic "1" outputted from the comparator 91. Since the logic "1" pulse has a duration shorter than the time constant ($c_2R$) of the time constant circuit constituted by the resistor R and the capacitor $c_2$, the Schmitt circuit 94 can not be driven. However, when the clock pulse having the level of 12 volts continues to exist for a period twice as long as that of the ordinary clock pulse, as indicated by (p+3) in FIG. 9 at (D), the Schmitt circuit 94 is turned on to produce an output signal $d_1$, as illustrated in FIG. 9 at ($d_1$), to thereby activate a driver 92 which then produces an output of zero volt onto the data signal line D. At that point, the flip-flop circuit 93 is reset.

The signal of zero volts (signal representative of logic "1") outputted onto the data signal line D is checked by an error check circuit 473 incorporated in the transmission/reception timing control apparatus shown in FIG. 4. Unless this signal is detected, it is then decided that some fault or failure is taking place.

The terminating unit may also be implemented in the address allocation type structure with simple modification. Namely, a counter and an address setting circuit in which another address than those allocated for signal transmission is placed as an end address is provided, wherein the end address is detected by the coincidence circuit to produce a corresponding output signal which is then supplied to the AND circuit A1 for thereby setting the flip-flop circuit 93.

The terminating circuit is connected to the immediately preceding stage by way of the start signal line S, the data signal line D, the ground potential line G and the power line P (as auxiliary power source). A smoothed voltage of about 24 volts is derived from the data signal line d through a filter constituted by a capacitor $c_1$ and a diode d, whereon a lower source voltage $V_{cc}$ is generated by the voltage converter 95 for energizing the electronic circuits constituting the terminating unit.

Next, description will be turned to the error check operation mentioned briefly in conjunction with the transmission/reception timing control apparatus shown in FIG. 4.

Referring to FIG. 4 in combination with FIG. 8(*b*), an output is generated from an output terminal (p+1) of the shift register 45 at a time point (p+1) succeeding immediately to the last clock (p-th clock) for the data transmission to the controlled devices or from the sensors, whereupon an end check is performed by an error-1 check circuit 471. More specifically, at this time point, the start signal is produced from the final stage of the shift register incorporated in the last unit of the first unit group provided in association with the controller (see FIG. 1) and supplied to a terminal R of the apparatus shown in FIG. 4. This start signal is check by the error-1 check circuit 471 at the clock timing of (p+1). In this conjunction, it should be mentioned that this function can be realized only when the individual units of the first unit group are of the start line type. Unless a "1" signal is detected, this means that the data signal is not transmitted to all the units. In that case, a relay X477 is driven through an OR circuit 475 and a driver 476 to energize a monitor lamp. Of course, such arrangement may equally be adopted in which the lamp normally lighting is deenergized upon occurrence of the error.

In response to the clock pulse (p+2), a second error check (referred to as error-2 check) is performed to determine whether the level of the data signal line at this time point is 12 volts (representing logic "0"). More specifically, the signal level on the data signal line D is compared with a reference voltage of 12 volts by the comparator 483. When the former is lower than 12 volts, logic "1" is outputted and otherwise logic "0" is outputted. The signal resulting from inversion of the abovementioned logic signal by NOT circuit is supplied to an error-2 check circuit 472. When the input to the latter is logic "1", this means that the system operates normally, while logic "0" input to the circuit 472 results in an error output therefrom.

Since the second error check (error-2) is performed at the time when data signal transmission to all the units has been completed, no logic "1" signal (voltage of zero volt) should make an appearance on the data signal line D. However, when then the logic "1" signal should be produced for some reason (e.g. short-circuit between the data line and the ground potential line, erroneous address setting or the like), this species of error can be detected by the error-2 check circuit 472.

At the timing of the next clock (p+3), it is checked by an error-3 check circuit 473 whether the signal on the data signal line D is logic "1" or logic "0". If it is logic "0", an error detection output is produced. In this state, the earlier half level of 24 volts of the clock signal is not outputted from the terminal (p+3) of the shift register of the timing control apparatus (FIG. 4) but the level of 12 volts continues to be outputted, as illustrated in FIG. 8(*b*) at (2). Consequently, the terminating unit shown in FIG. 7 outputs the signal of zero-volt level (logic 37 1") on the data signal line D through the operation described previously. Accordingly, the signal on the data signal line at this time point is detected by the comparator 483 and checked by the error-3 check circuit 473 at the rise-up edge of the pulse (p+4). If the signal is logic "0", it is indicated that the transmission cable does not reach the terminating unit because of line breakage, short-circuit or the like fault.

At the next clock timing (p+4), the counter 43 is reset in response to the output from the terminal (p+4) of the shift register. In response to the falling edge of the output (p+4), the start signal to be supplied to the start line type unit is produced from the flip-flop circuit 46. The start signal outputted from a buffer 481 or 482 is detected by an AND circuit 480 and checked by an error-4 check circuit 474. If abnormality is found, an error output signal is produced to derive the relay X, as in the case of occurrence of the other errors.

As will now be appreciated from the foregoing description, with the structure of the control/supervisory signal transmission system according to the invention in which the transmitter units and the receiver units are connected to the transmission/reception timing control apparatus, wherein the clock pulse signal superposed on a power source voltage and modulated in the level to represent control data or supervisory information is outputted onto the common data signal line, it is possible to realize the bidirectional signal transmission between the controller and the controlled devices and between the controller and the monitoring sensors with a simplified structure.

Further, when the address allocation type transmission/reception unit, the number of the connecting lines can be decreased, whereby the wiring cost can corresponding be reduced, while the wiring among the individual units can be simplified to great advantage. Since allocation of the addresses to the individual units can be performed arbitrarily, the unit can be added or removed arbitrarily. Further, according to the address allocation type transmission system, it is possible to provide a plurality of receiver units in correspondence to a single transmitter unit, whereby same data may be supplied simultaneously to a plurality of receiver units installed at different positions. Besides, according to another aspect of the invention, an error check can constantly be carried out in the course of signal transmission to detect immediately any error, if one occurs. Thus, reliability of the transmission system can be enhanced significantly.

What is claimed is:

1. A control/supervisory signal transmission system for transmitting control signals from a controller to controlled devices and transmitting supervisory signals from sensors monitoring said controlled devices to said controller through a common data signal line, comprising:

transmission/reception timing control means including timing generator means for generating a timing signal, power supply means for generating a power supply voltage of a predetermined constant level ($V_x$), voltage conversion means connected to said power supply means and said timing generator means for converting to said power supply voltage into a series of pulse-like voltage signals in synchronism with said timing signal, wherein said pulse-like voltage signals have two different voltage levels ($v_x/2$ and 0 volts) differing from said power supply level ($v_x$) said two different voltage levels are outputted onto said data signal line;

a first unit group connected to said controller and to said transmission/reception timing control means by way of at least said data signal line and including at least one first transmitter unit connected to said data signal line for receiving said timing signal to thereby modulate the level of said series of pulse-like voltage signals on said data signal line with control data supplied in parallel from said controller in synchronism with said timing signal, and at least one first receiver unit connected to said controller and to said transmission/reception timing control means by way of said signal data line for extracting the serial supervisory signals originating in said sensors from said data signal line in synchronism with said timing signal to thereby supply said supervisory signals to said controller in parallel; and a second unit group connected to said transmission/-reception timing control means and including at least one second receiver unit connected to said controlled devices and to said data signal line for demodulating the level of said serial pulse-like voltage signals supplied from said first transmitter unit over said data signal line to thereby extract said control data to be supplied to said controlled devices in synchronism with said timing signal and at least one second transmitter unit connected to said sensors and said data signal line for receiving said timing signal to thereby modulate the levels of said serial pulse-like voltage signals on said data signal line with supervisory data signals supplied parallel from said sensors for transmission thereof to said first receiver unit in synchronism with said timing signal.

2. A control/supervisory signal transmission system according to claim 1, wherein each of said transmitter units and said receiver units of said first and second unit groups includes first power generating means for generating from said pulse-like voltage signal a power supply voltage of a constant level for electrically energizing component circuits constituting each of said units.

3. A control/supervisory signal transmission system according to claim 1, wherein each of said transmitter units and each of said receiver units of said second unit groups includes second power generating means for generating from said pulse-like voltage signal a power supply voltage for electrically driving said controlled devices and said sensors, respectively.

4. A control/supervisory signal transmission system according to claim 2, wherein each of said transmitter units and each of said receiver units of said second unit groups includes second power generating means for generating from said pulse-like voltage signal a power supply voltage for electrically driving said controlled devices and said sensors, respectively.

5. A control/supervisory signal transmission system according to claim 1, wherein said controlled devices and said sensors are electrically driven from said power supply means of said transmission/reception timing control means by way of a power transmission line.

6. A control/supervisory signal transmission system according to claim 1, said control data signal and said supervisory signal being binary signals, respectively, wherein the level of said pulse-like voltage signals is modulated with said binary signals to two discriminable data levels ($V_x/2$ volts and 0 volt) corresponding to "OFF" and "ON" levels, respectively of said binary signal relative to a non-data level ($V_x$).

7. A control/supervisory signal transmission system according to claim 1, wherein said first transmitter unit of said first unit group and said second receiver unit of said second unit group are provided a number of m in pairs, respectively, being associated in one-to-one correspondence with each other and connected to said data signal line in a predetermined order in the respective unit groups, while said first receiver unit of said first unit group and said second transmitter unit of said second unit group are provided in a number of n pairs, respectively, being associated in one-to-one correspondence with each other and connected to said data signal line in a predetermined order in the respective unit groups, so that the associated transmitter and receiver units are successively operated in said predetermined order to thereby transfer the control data signals and the supervisory signals for and from the respective controlled devices and sensors under the control of said timing signal.

8. A control/supervisory signal transmission system according to claim 7, further including a terminating unit installed in succession to a final stage of the units connected in said predetermined order within one of said first and second unit groups, wherein said terminating unit includes means for generating a signal of a predetermined wave form at every end of transmission of one frame to all the units belonging to the group in which said terminating unit is installed, and wherein said transmission/reception timing control means including check circuit means for checking the line state of said data signal line in response to said signal of predetermined wave form.

9. A control/supervisory signal transmission system according to claim 7, said timing generator means of said transmission/reception timing control means including first start signal generating means for generating a first start signal, while each of said transmitter units and said receiver units includes second start signal generating means for generating a second start signal, wherein first pair of the associated transmitter unit and receiver unit in said sequence in said first and second unit groups are triggered into transfer operation in response to said first start signal, and upon completion of operation of said first pair of the transmitter and receiver units, said second start signal generating means generates said second start signal for triggering transfer operation of a succeeding pair of the transmitter unit and the receiver unit in said first and second groups, said triggering by said second start signal being repeated until the last pair of the transmitter and receiver units in said sequence is triggered into transfer operation.

10. A control/supervisory signal transmission system according to claim 9, said transmitter units and said receiver units are connected to one another through a start signal line for carrying said second start signals, wherein said first start signal is conveyed to said first pair of the transmitter unit and said receiver unit through said data signal line in a discriminable waveform.

11. A control/supervisory signal transmission system according to claim 9, wherein said transmission/reception timing control means, said transmitter units and said receiver units are connected to one another through start signal lines for carrying said start signals.

12. A control/supervisory signal transmission system according to claim 1, said transmitter and receiver units in said first and second unit groups being connected to said common data signal line at arbitrarily given locations, wherein said transmission/reception timing control means includes start signal generating means for generating a start signal to be supplied to said transmitter and receiver units, respectively, over said data signal line in a discriminable waveform, each of said transmitter and receiver units including means for extracting a clock signal from said modulated pulse-like voltage signal, counter means for counting said clock signal in response to said start signal, and address setting means for holding an address allocated to the associated unit, wherein when the count value of said counter means has attained a value representing said address, the associated unit starts transmitting or receiving operation.

13. A control/supervisory signal transmission system according to claim 12, wherein a plurality of said receiver units belonging to said second unit group are allocated with a same address so that said plurality of receiver units of the second unit group are operated simultaneously with one of said transmitter units belonging to said first unit group.

14. A control/supervisory signal transmission system according to claim 12, wherein a plurality of said receiver units belonging to said first unit group are allocated with a same address so that said plurality of receiver units of the first unit group are operated simultaneously with one of said transmitter units belonging to said second unit group.

15. A control/supervisory signal transmission system according to claim 1, said transmitter and receiver units in said first unit group being connected to said common data signal line in a predetermined sequential order, while said transmitter units and said receiver units in said second group are connected to said data signal line in an arbitrary sequential order, wherein said transmission/reception timing control means includes start signal generating means for generating a start signal to be supplied to said transmitter and receiver units of said second group over said data signal line in a discriminable waveform and to said transmitter and receiver unit of said first group over a start signal line for starting operation of said transmitter and receiver units of said first group successively in said sequential order, each of said transmitter and receiver units of said second group including means for extracting a clock signal from said modulated pulse-like voltage signal, counter means for counting said clock signal in response to said start signal, and address setting means for holding an address allocated to the associated unit, wherein when the count value of said counter means has attained a value representing said address, the associated unit starts transmitting or receiving operation.

16. A control/supervisory signal transmission system according to claim 1, said transmitter and receiver units in said second unit group being connected to said common data signal line in a predetermined sequential order, while said transmitter units and said receiver units in said first group are connected to said data signal line in an arbitrary sequential order, wherein said transmission/reception timing control means includes start signal generating means for generating a start signal to be supplied to said transmitter and receiver units of said first group over said data signal line in a discriminable waveform and to said transmitter and receiver unit of said second group over a start signal line for starting operation of said transmitter and receiver units of said second group successively in said sequential order, each of said transmitter and receiver units of said first group including means for extracting a clock signal from said modulated pulse-like voltage signal, counter means for counting said clock signal in response to said start signal, and address setting means for holding an address allocated to the associated unit, wherein when the count value of said counter means has attained a value representing said address, the associated unit of said first starts transmitting or receiving operation.

* * * * *